United States Patent
Jackson

(10) Patent No.: US 11,699,353 B2
(45) Date of Patent: Jul. 11, 2023

(54) SYSTEM AND METHOD OF ENHANCEMENT OF PHYSICAL, AUDIO, AND ELECTRONIC MEDIA

(71) Applicant: Tomestic Fund L.L.C., Atlanta, GA (US)

(72) Inventor: Larry Lemar Jackson, Atlanta, GA (US)

(73) Assignee: Tomestic Fund L.L.C., Atlanta, GA (US)

(*) Notice: Subject to any disclaimer, the term of this patent is extended or adjusted under 35 U.S.C. 154(b) by 201 days.

(21) Appl. No.: 16/924,462

(22) Filed: Jul. 9, 2020

(65) Prior Publication Data

US 2021/0012676 A1  Jan. 14, 2021

Related U.S. Application Data

(60) Provisional application No. 62/872,557, filed on Jul. 10, 2019.

(51) Int. Cl.
 *G09B 5/06* (2006.01)
 *G06T 19/00* (2011.01)
 (Continued)

(52) U.S. Cl.
 CPC ............ *G09B 5/065* (2013.01); *G06Q 30/04* (2013.01); *G06T 19/006* (2013.01); *G09B 5/067* (2013.01);
 (Continued)

(58) Field of Classification Search
 CPC . G06T 19/006; G06T 2200/24; G02B 27/017; A63F 2300/8082; G06V 20/20;
 (Continued)

(56) References Cited

U.S. PATENT DOCUMENTS

| 6,411,943 B1 | 6/2002 | Crawford |
| 8,013,240 B2 | 9/2011 | Forrest et al. |

(Continued)

FOREIGN PATENT DOCUMENTS

| CN | 105844979 A | 8/2016 |
| CN | 209265435 U | 8/2019 |

(Continued)

OTHER PUBLICATIONS

Jean-Lue Lugrin, Artificial intelligence mediated interaction in virtual reality art, 2006, Interactive Entertainment, pp. 1-9 (Year: 2006).*

(Continued)

*Primary Examiner* — Justin S Lee
(74) *Attorney, Agent, or Firm* — Wilson Sonsini Goodrich & Rosati

(57) ABSTRACT

Disclosed herein are systems and methods for generating and delivering extended reality content, such as augmented reality, mixed reality, and virtual reality, to physical, electronic, and audio media using deep learning algorithms, dynamic differential programming, and application programming interfaces. Such media can include, for example, printed books, electronic books, and audiobooks that can be prompted from a physical electronic device for immersive recyclable digital media utilization.

20 Claims, 33 Drawing Sheets

(51) Int. Cl.
*G06Q 30/04* (2012.01)
*H04W 4/021* (2018.01)

(52) U.S. Cl.
CPC ........ *H04W 4/021* (2013.01); *G06Q 2220/12* (2013.01)

(58) Field of Classification Search
CPC .......... G09B 5/06; G09B 5/065; G09B 5/062; G09B 5/067
See application file for complete search history.

(56) References Cited

U.S. PATENT DOCUMENTS

| | | | |
|---|---|---|---|
| 8,186,100 B2 | 5/2012 | Chuang et al. | |
| 8,644,546 B2 | 2/2014 | Conwell | |
| 9,286,724 B2 | 3/2016 | Lucas-Woodley et al. | |
| 9,318,108 B2 | 4/2016 | Gruber et al. | |
| 9,390,710 B2 | 7/2016 | Seo et al. | |
| 9,660,207 B2 | 5/2017 | Ihn et al. | |
| 9,836,790 B2 | 12/2017 | Ronca et al. | |
| 10,084,891 B2 | 9/2018 | Gowda et al. | |
| 10,569,164 B1* | 2/2020 | Bleasdale-Shepherd | A63F 13/53 |
| 10,902,395 B1* | 1/2021 | Knas | G06F 3/011 |
| 2004/0070195 A1* | 4/2004 | Nelson | B42D 3/123 283/83 |
| 2006/0033724 A1* | 2/2006 | Chaudhri | G06F 3/04886 345/173 |
| 2007/0093169 A1 | 4/2007 | Blaszczyk et al. | |
| 2011/0307254 A1 | 12/2011 | Hunt et al. | |
| 2012/0214272 A1 | 8/2012 | Azuma et al. | |
| 2013/0076788 A1 | 3/2013 | Ben Zvi | |
| 2013/0173807 A1* | 7/2013 | De Groot | G06Q 50/06 709/226 |
| 2014/0278403 A1 | 9/2014 | Jacob et al. | |
| 2015/0057042 A1* | 2/2015 | Lection | H04W 4/08 455/519 |
| 2015/0363778 A1 | 12/2015 | Ronca et al. | |
| 2015/0363876 A1 | 12/2015 | Ronca et al. | |
| 2016/0059146 A1 | 3/2016 | Javidan et al. | |
| 2016/0063876 A1 | 3/2016 | Javidan et al. | |
| 2016/0133222 A1* | 5/2016 | Paxson | G06F 3/0412 156/60 |
| 2016/0203645 A1 | 7/2016 | Knepp et al. | |
| 2016/0225187 A1 | 8/2016 | Knipp et al. | |
| 2016/0343264 A1 | 11/2016 | Murdock et al. | |
| 2016/0351188 A1 | 12/2016 | Rao et al. | |
| 2017/0169598 A1 | 6/2017 | York et al. | |
| 2017/0185596 A1* | 6/2017 | Spirer | H04N 21/431 |
| 2018/0089758 A1 | 3/2018 | Stradling et al. | |
| 2018/0322674 A1* | 11/2018 | Du | G06K 9/6267 |
| 2021/0192505 A1* | 6/2021 | Xu | G06Q 20/3823 |

FOREIGN PATENT DOCUMENTS

| | | |
|---|---|---|
| EP | 2812089 B1 | 4/2019 |
| GB | 2500431 A | 9/2013 |
| KR | 100788961 B1 | 12/2007 |
| KR | 20110091126 A | 8/2011 |
| KR | 20120001967 U | 3/2012 |
| KR | 20140097657 A | 8/2014 |
| WO | WO-2016073185 A1 | 5/2016 |
| WO | WO-2017080965 A1 | 5/2017 |
| WO | WO-2020081967 A1 | 4/2020 |

OTHER PUBLICATIONS

Darling et al., The Case for Organic Photovotaics, RSC Advances, 2013, 3, 17633-17648.

Gail Tverberg, Ten Reasons Intermittent Renewables (Wind and Solar PV) are a Problem, Our Finite World, Exploring how oil limits affect the economy, Jan. 21, 2014.

\* cited by examiner

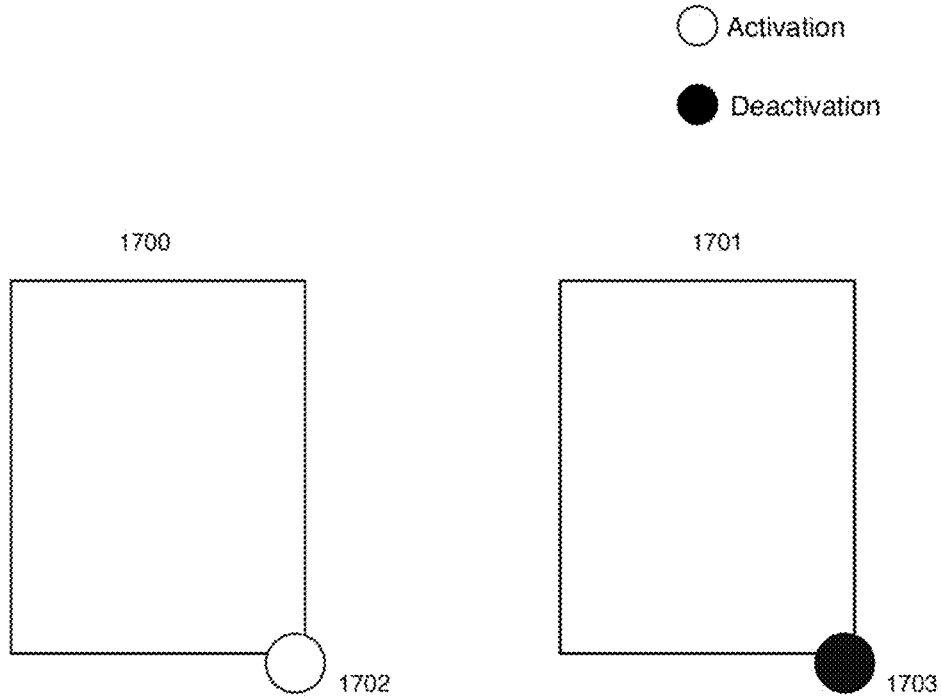

```
bool isActivated = false;
bool isDectivated = false;
float activation,deactivation;
public static string[] activation = time.time; (Time is time that application upon open)
public string timeleft = 30.0f;
if(activation > timeleft)
{
isActivated = false;
isDeactivated = true;
deactivation++;
activation = 0;
}
else{
isActivated = true;
activation++;
isDeactivated = false;
deactivation = 0;
}
```

FIG. 17

| Category: | Celebrity | Professor/ Teacher | Public Speaker |
|---|---|---|---|
| Language: | English | Spanish | Arabic |
| Accent: | English (Scottish) | Chinese (Mandarin) | French (African) |
| Dialect: | Saudi | Catalan | Southern (American) |
| Emotion: | Excitable | Soothing | Humorous |
| Gender: | Male | Female | Other |
| Pace: | Slower | Normal | Faster |
| Style: | Proper | Conversational | Proformance |
| Voice Age: | 8-12 | 13-18 | 19-30 |
| Voice Tone: | High Pitch | Medium | Low Pitch |

FIG. 32

SYSTEM AND METHOD OF ENHANCEMENT OF PHYSICAL, AUDIO, AND ELECTRONIC MEDIA

CROSS-REFERENCE

This application claims the benefit of U.S. Provisional Application No. 62/872,557, filed Jul. 10, 2019, the content of which is incorporated herein by reference in its entirety.

INCORPORATION BY REFERENCE

Each patent, publication, and non-patent literature cited in the application is hereby incorporated by reference in its entirety as if each was incorporated by reference individually.

BACKGROUND

Compared to traditional methods of teaching, augmented reality teaching methods can increase the level of reading comprehension and learning permanency in students. Augmented reality teaching methods also enhance student engagement and reduce anxiety levels. Augmented reality can improve a range of educational and quality of life products.

SUMMARY

In some embodiments, the invention provides a method of electronically generating extended reality based media on a device, comprising: a) processing a content input to generate a virtual representation of the extended reality based media on the device, wherein the processing of the content input is by using organic photovoltaic cells of the device; b) mediating an interaction between a plurality of users and the extended reality based media using artificial intelligence; and c) processing an electronic payment transaction that is associated with the extended reality based media.

In some embodiments, the invention provides a computer program product comprising a non-transitory computer-readable medium having computer-executable code encoded therein, the computer-executable code adapted to be executed to implement a method of generating extended reality based media on a device, comprising: processing an extended reality system, wherein the extended reality system comprises: i) a content input module; ii) an augmentation module; iii) a communication module; and iv) an electronic payment module; b) receiving, by the content input module, a content input from a source; c) processing, by the augmentation module, the content input to generate a virtual representation of the extended reality based media on the device, wherein the processing of the content input is by using organic photovoltaic cells of the device; d) mediating, by the communication module, an interaction between a plurality of users and the extended reality based media using artificial intelligence; and e) processing, by the electronic payment module, an electronic payment transaction that is associated with the extended reality based media.

BRIEF DESCRIPTION OF THE DRAWINGS

FIG. 17 depicts activation and deactivation of an augmented reality media device described herein.

FIG. 32 depicts a multifaceted interactive narration (MIN) artificial intelligence system described herein.

DETAILED DESCRIPTION

Figure 1:
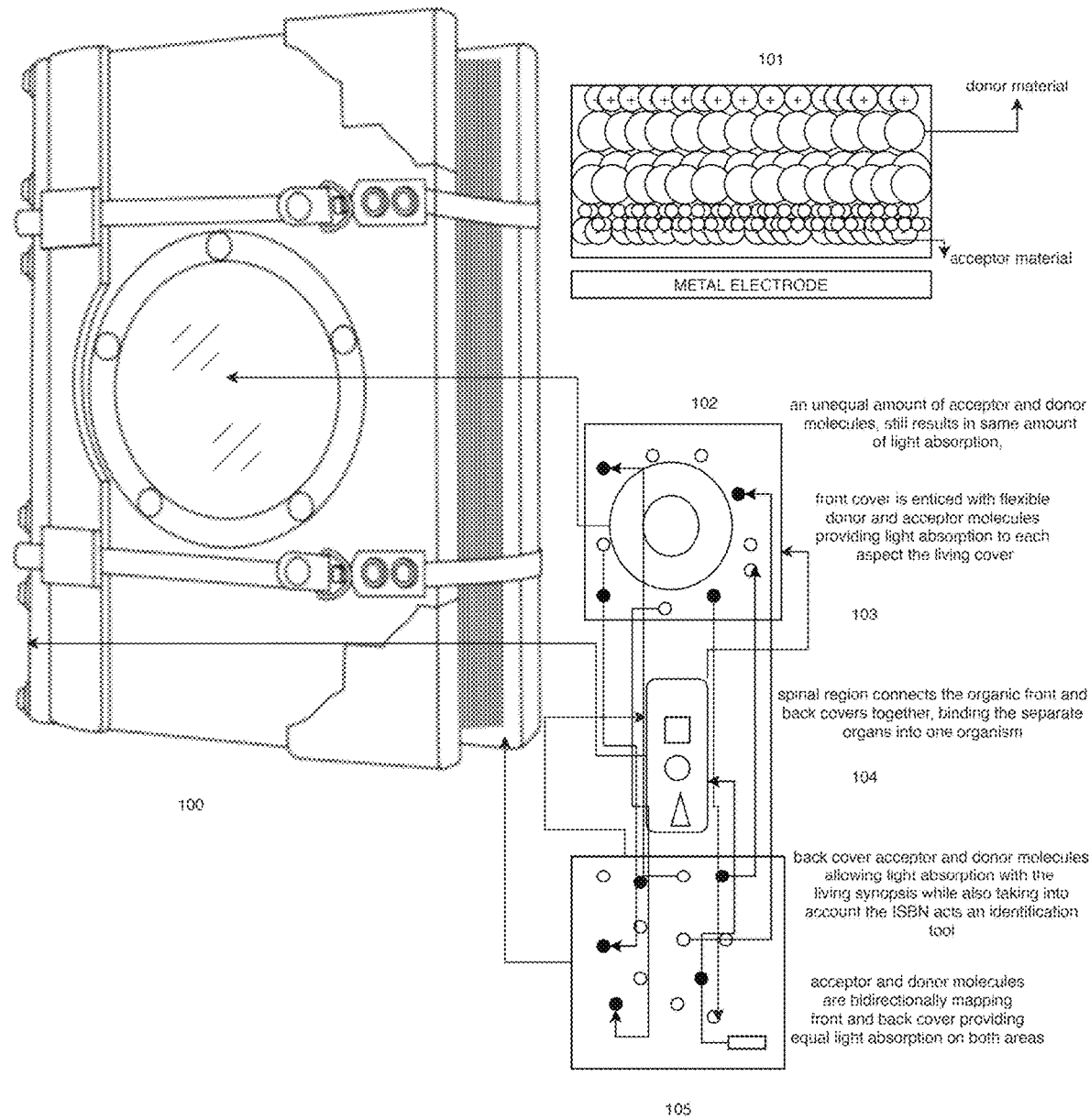
FIG. 1 depicts an example of augmented reality media device described herein.

Described herein are systems and methods for generating and delivering augmented reality content from pre-existing physical, electronic, and audio media. Such media include, for example, printed books, electronic books, and audiobooks. Other media include, for example, posters, flyers, reports, billboards, newspapers, magazines, catalogs, blueprints, and signs.

Further described herein are devices that collect media for augmentation and deliver augmented reality content to a user. Non-limiting examples of such devices include a mobile device, a cell phone, a laptop, and a tablet. Media captured by methods described herein can be supplemented with relevant audio and visual content, as well as haptic feedback. Individual instances of capturing media can be additionally assigned a location and time stamp. Such time and location data can be assigned to the captured media and be used to allow time and location-dependent functionality. An inventory of media captured by a user can be used to generate a corresponding library of virtual objects deliverable to the user via augmented reality.

Further described herein are systems and methods that amalgamate organic photovoltaic cells and extended reality components to produce an organic living book. Users of organic living books can experience extended reality components by viewing a page of the book using built-in software components on an electronic device having a display, a camera, and a communication interface. The extended reality components of these devices can interact with an online database. For example, the extended reality system stores media for each living page in the online database. Stored media can be used in alignment with software applications of the electronic device using a communication interface. The communication interface can be achieved using Wi-Fi, cellular data, wired internet connection, and/or hotspot connectivity. Users can project animations on the device through the use of extended reality, such as augmented reality, virtual reality, and mixed reality. Users can interact with the other users, historical figures, as well as other features provided within the extended reality experience. Users can also assume the role of a living book master or a living book creator by creating viable content, uploading viable content, and obtaining cryptocurrency in exchange for user engagement with the extended reality experience.

Organic Photovoltaic Solar Cells

Organic photovoltaic (OPV) cells convert light energy (e.g., solar energy) to electrical energy through photoactive materials engulfed between two electrodes. Photoactive layers, composed of donor and acceptor semiconducting organic materials, absorb light (e.g., sunlight) to generate photocurrents. Two prominent types of organic cell structures are bilayer and heterojunction. Bilayer structures contain two distinct donor and acceptor layers between the conductive electrodes. Heterojunction structures contains donor and acceptor cells that are intertwined within each other. OPV cells can be used to produce a greenhouse structure with acceptor and donor layers and electrodes encasing the entire structure.

Monolithic Architecture

Monolithic architecture is the traditional model for the design of a software application program. Monolithic architecture is composed in a single application. Components are interconnected and interdependent rather than loosely coupled or separated. In this tightly coupled architecture, each component and associated components must be present for code to be executed. If any individual component is to be updated, the entire application must be overwritten and restarted. The counterpart of the monolithic approach is a microservice type of architecture. Microservices deal with creating a single application as a small suite of services, each running on independent process and communicating through an application programming interface (API) gateway. These services can be independently deployed and tested through continuous deployment and continuous integration software. A polyglot approach is often sought after allowing individual microservices to be completed using different technological stacks. For example, one microservices uses C# and the other microservices uses PHP while not disturbing the other microservice components.

In microservices architecture, modular components exist separately. This architecture allows each component to contribute to the overall production of a large piece of software. Each component acts as an individual miniature system. All components are circularly linked with one another, thereby allowing certain components to persist through different stages, similar to monolithic architecture.

Artificial Intelligence and Voice Recognition

Artificial Intelligence (AI) is the human-like intelligence, judgment, learning, and awareness exhibited by machines using computer science and engineering to create intelligent machines. Four approaches to AI exist: thinking humanely, acting humanely, thinking rationally, and acting rationally.

Voice recognition is used to perform commands without having to use a keyboard or mouse. Non-limiting examples of voice recognition systems are automated phone systems, Google® Voice, Amazon Echo®, Apple® Siri, Google® Assistant, and bluetooth systems. Types of voice recognition systems include natural language processing, and discrete and continuous speech recognition. Voice recognition systems can increase independence, decrease anxiety, and improve user access to normally inaccessible language.

Cryptocurrency

Cryptocurrency uses cryptographic protocol to encrypt sensitive data transfers to secure units of exchange. Cryptocurrency functionality is based on user interaction, transactions, and creation of new cryptocurrency units. Ethereum, a popular cryptocurrency, is created through smart contracts, for example, on a public blockchain network. Ethereum provides a decentralized platform for distributed application development. Decentralized applications (DAPP) have code running on a decentralized peer-to-peer network. DAPP are run on computing systems, such as Ethereum or Bitcoin. Cryptocurrency can provide authentication for the transfer of funds between users, for example, by generating private and public keys.

Augmented reality can be incorporated into specifically designed books that contain a fiducial marker. Augmented reality can also be implemented within technology that superimposes three-dimensional objects in a spatial area.

Augmented Reality Based Media

Organic Living Books

Figure 2:
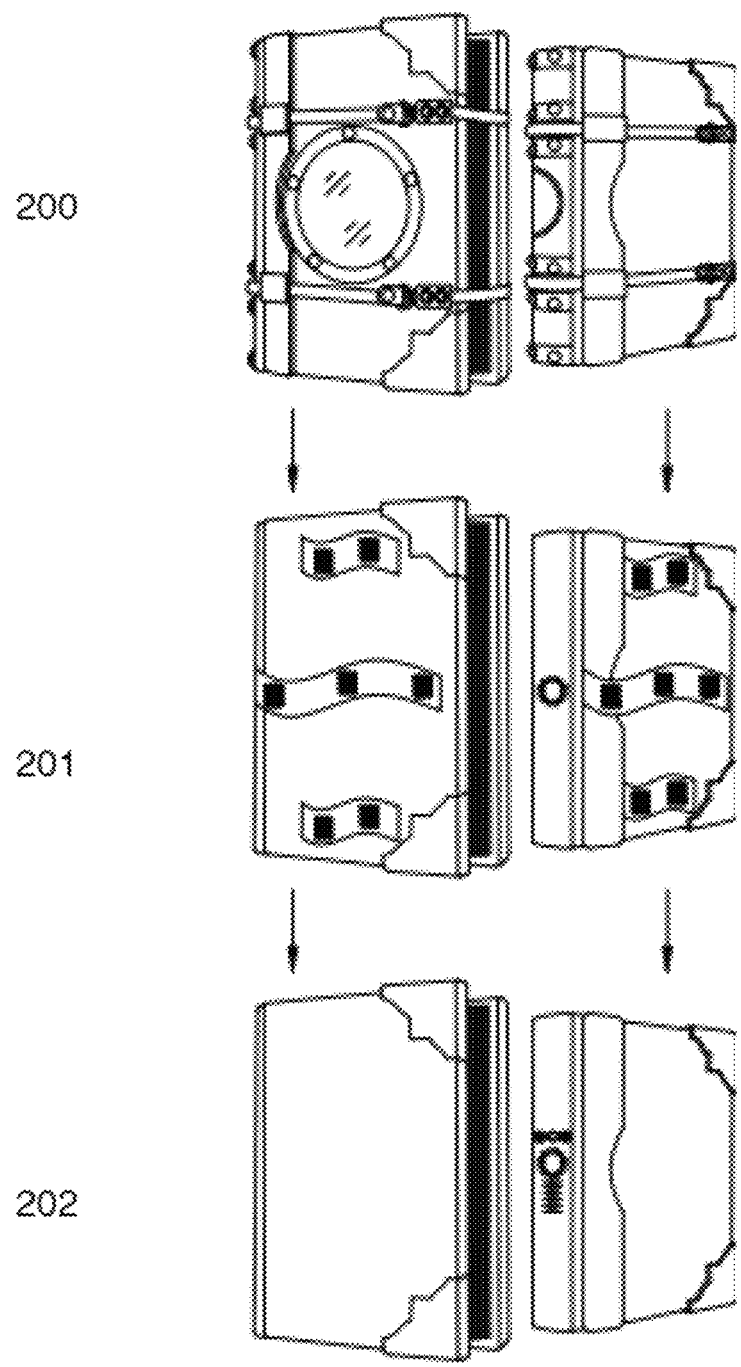
FIG. 2 depicts multiple views of an augmented reality media device described herein.
Figure 3:
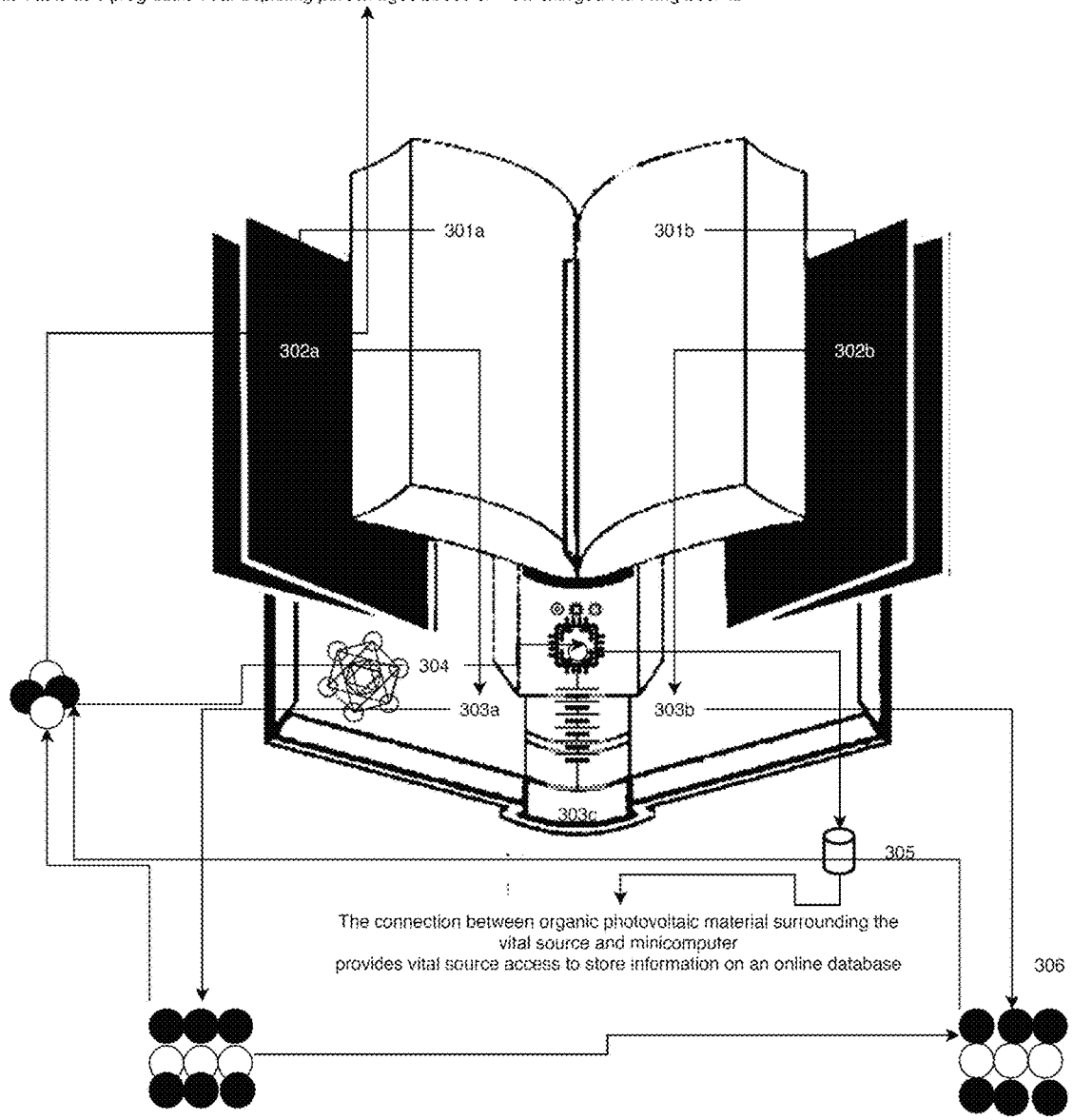
FIG. 3 depicts components of an augmented reality media device described herein.

Augmented reality based media, for example, can be in the form of augmented reality based book, referred to as an organic living book or a living book. Living books are created using extended reality components such as organic photovoltaics. FIG. 1-3 depict examples of a living book encased with donor and acceptor photovoltaics materials.

As depicted in FIGS. 1 and 2, an organic living book 100 can be created using organic photovoltaic cells composed of acceptor and donor materials surrounded by metal electrodes 101 and 201. An unequal number of acceptor and donor layer photovoltaic cells can be encased in each layer of the book, while providing adequate light absorption to each portion of the book and adjusting for the missing acceptor and donor cells 102. Acceptor and donor layers on the front cover 103 are mapped among the layers on the back cover 105 to provide an equivalent amount of light absorption on both surfaces. The spinal portion, referred to as the augmented spine, can contain a minicomputer configured for data transmission, a solid state battery, and a neural networked structure that links the living book cover and living book synopsis. The spinal region 104 and 202 intertwines the front and back covers, thereby creating an organism out of each individual organ (i.e., the living book encompassing individual components of the book). Organic light emitting diodes (OLED) surround the front cover of the book to create a cinematographic trailer at the beginning of the living book 100 and 200.

FIG. 3 depicts individual components of the living book. Each individual layer of the book is encased with organic photovoltaic cells. The outer layer 303a and 303b of the living book 300 maintains the most prominent layer of organic photovoltaics and causes a trickledown effect of organic photovoltaics encased in each subsequent layer 302a, 302b, 301a, and 301b. The front and back covers, the front and back endpapers, and the paper pages of the living book are each separate entities. The augmented spinal region 303c connects each of these layers together. The interrelation of the minicomputer 304 and organic photovoltaic cells 306 results in a fully organically endowed book that facilitates light absorption and stores relevant information in an online database 305.

Figure 4:
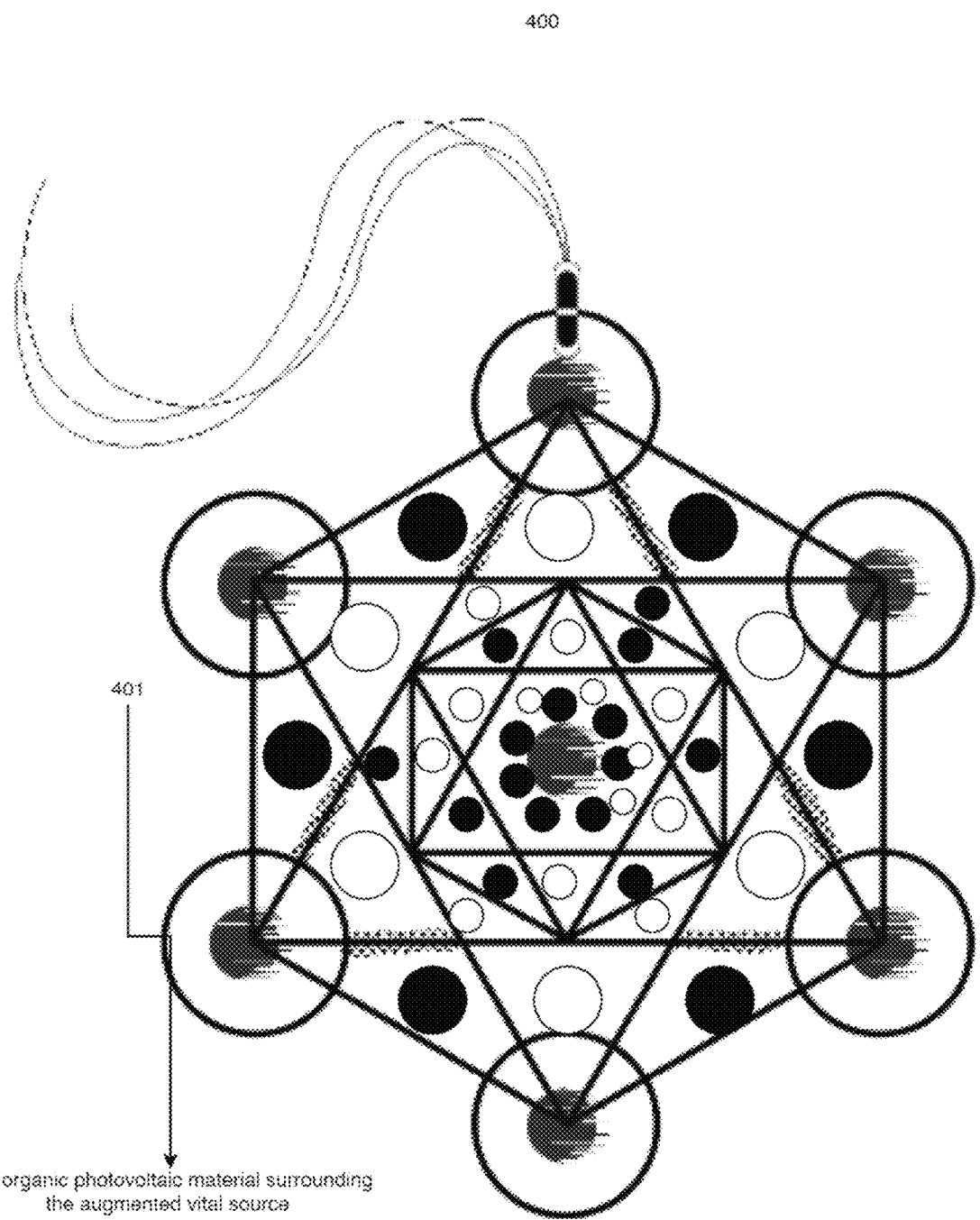
FIG. 4 depicts an augmented vital source of an augmented reality media device described herein.

An augmented vital source acts as an extended reality heartbeat that provides birthplace and birthdate information for the living book. FIG. 4 depicts an in-depth view of an augmented vital source held within the inner front cover of the living book depicted in FIG. 1-3. The augmented vital source 400 is encased with organic photovoltaic cells 401, which absorb light and emit a projection based on the living birthplace and the living birthdate. Thus, the augmented vital source 400 acts as a progression bar for the energy absorbed by the book. When light is available, the energy source is light. In the absence of light, the energy source is a solid state battery. The augmented vital source 400 can be logged into an online database through a connection with the minicomputer within the augmented book spine.

Figure 5:
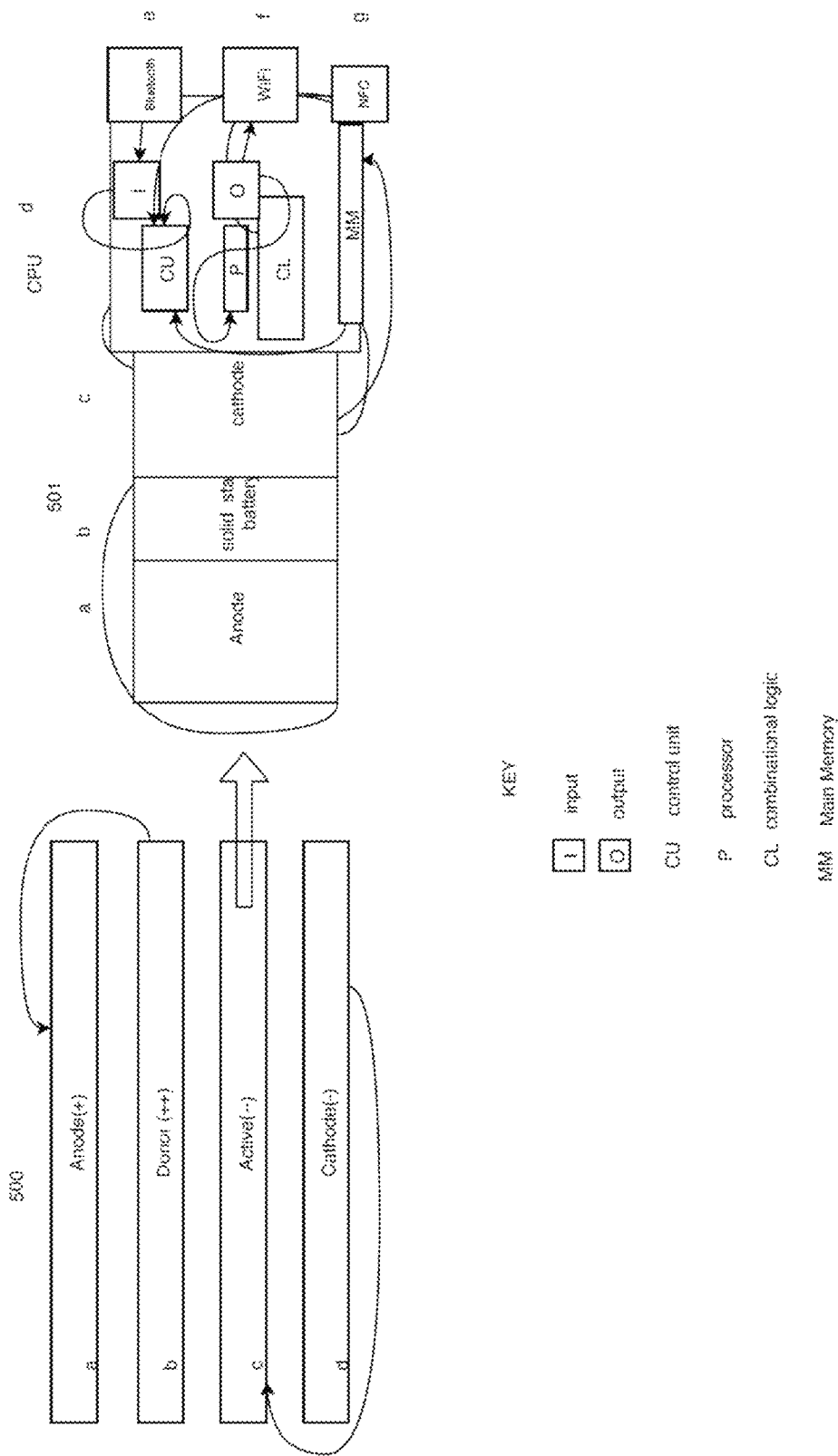
FIG. 5 depicts the spinal region of an augmented reality media device described herein.

FIG. 5 is a layered diagram that depicts the spinal region of a living book. Electrodes 500a and 500d surround the outer layers of the minicomputer 501. Organic photovoltaic materials connect the augmented spine 500 to the rest of the organic photovoltaic material encasing the living book. The electrodes contain acceptor and donor layers, which connect photovoltaic materials to external devices 500b and 500c. The minicomputer (CPU) 501d contains multiple functional components, including a combinational logic (CL), a processor (P), a main memory (MM), a control unit (CU), an input (I), and an output (O). The minicomputer 501d contains a bluetooth integrated chip 501e, a wireless internet integrated chip 501f, and a near field communication card 501g, each of which facilitate communication between wireless devices and the Internet. The solid state battery 501b acts as an alternative energy source when light absorption is unavailable. The battery is encased between two electrodes 501a and 501c.

Organic Photovoltaics

Systems described herein can include polymers or molecules that produce electricity from sunlight by blending donor and acceptor materials. The materials can be engulfed with cathode and anode layers. Each of the discontinuous layers can have a dimension that is greater than or equal to 100 nanometers. The band gap of one photovoltaic cell can be greater than the band gap of another photovoltaic cell. The band gap of one piece of photovoltaic material can be greater than the band gap of the donor host material and greater than the band gap of the acceptor host material. The donor material molecules can be large, and the acceptor material molecules can be small, or vice versa. In some embodiments, the first continuous layer is not in direct contact with the second continuous layer in-between the islands. In some embodiments, electron acceptors of the same layers and/or electron donors do not absorb an equal amount of light. In some embodiments, a ratio of a first electron acceptor layer and a subsequent electron acceptor layer is about 1:99 or 99:1. In some embodiments, a distance from one layer to another layer is not more than one exciton diffusion length of the respective organic photovoltaic material for a majority of the layers for each organic photovoltaic material. In some embodiments, a distance from one layer to another layer is more than one exciton diffusion length of the respective organic photovoltaic material for a majority of the layers for each organic photovoltaic material.

In some embodiments, the power conversation efficiency compares maximum power emitted from light sources, thereby consistently updating power efficiency of the device. The degradation of photovoltaic cells can be minimized, thereby expanding the usage of solar energy.

In some embodiments, bulk heterojunctions result in a linked chain of molecules rapidly moving back and forth between acceptor and donor layers, thereby decreasing the time required for recombination of excitons to occur. The microprocessing device can be utilized with a diffusion coefficient that increases the lifespan of excitons transporting between acceptor and donor layers. Electrode currencies can be strongly positive or strongly negative to provide more sustainable photovoltaic material.

Figure 19:
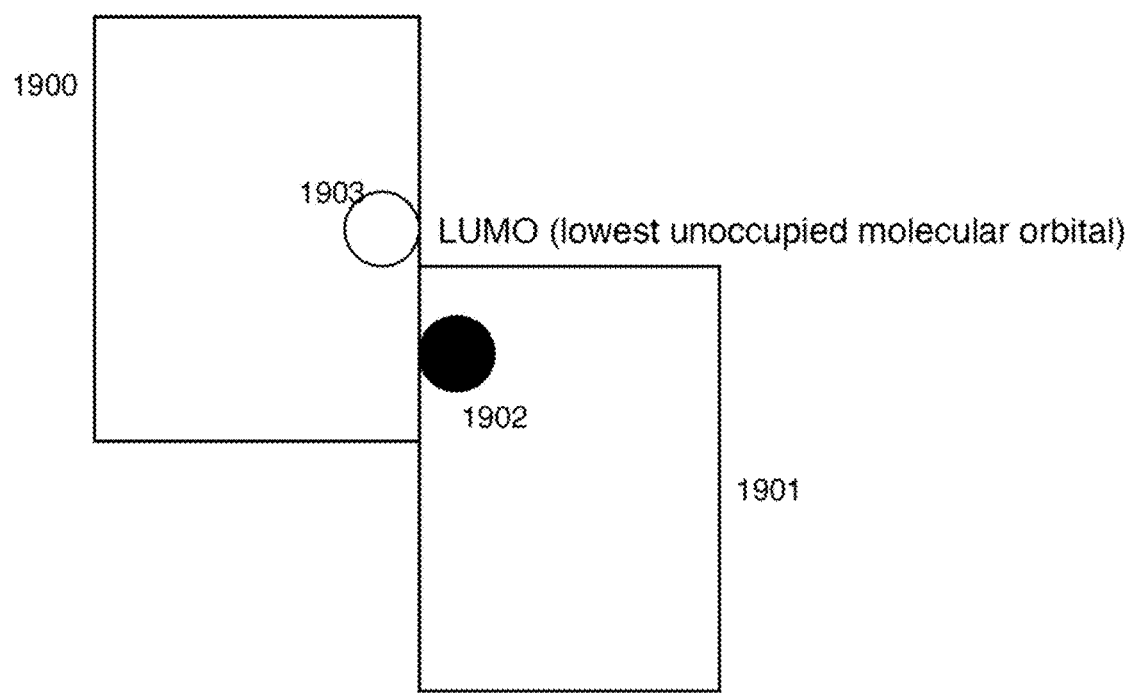
FIG. 19 depicts exciton current flow between donor and acceptor materials.

FIG. 19 depicts current flow of excitons between donor and acceptor materials. The highest occupied molecular orbital (HOMO) 1903 and lowest unoccupied molecular orbital (LUMO) 1902 are the main sources of exciton transfers between acceptor layer 1900 and donor layer 1901. When the excitons come within close vicinity of each other, the excitons easily flow between acceptor and donor materials. The closer together the excitons are to one another, the more stable and continuous the flow between the layers.

Figure 20:
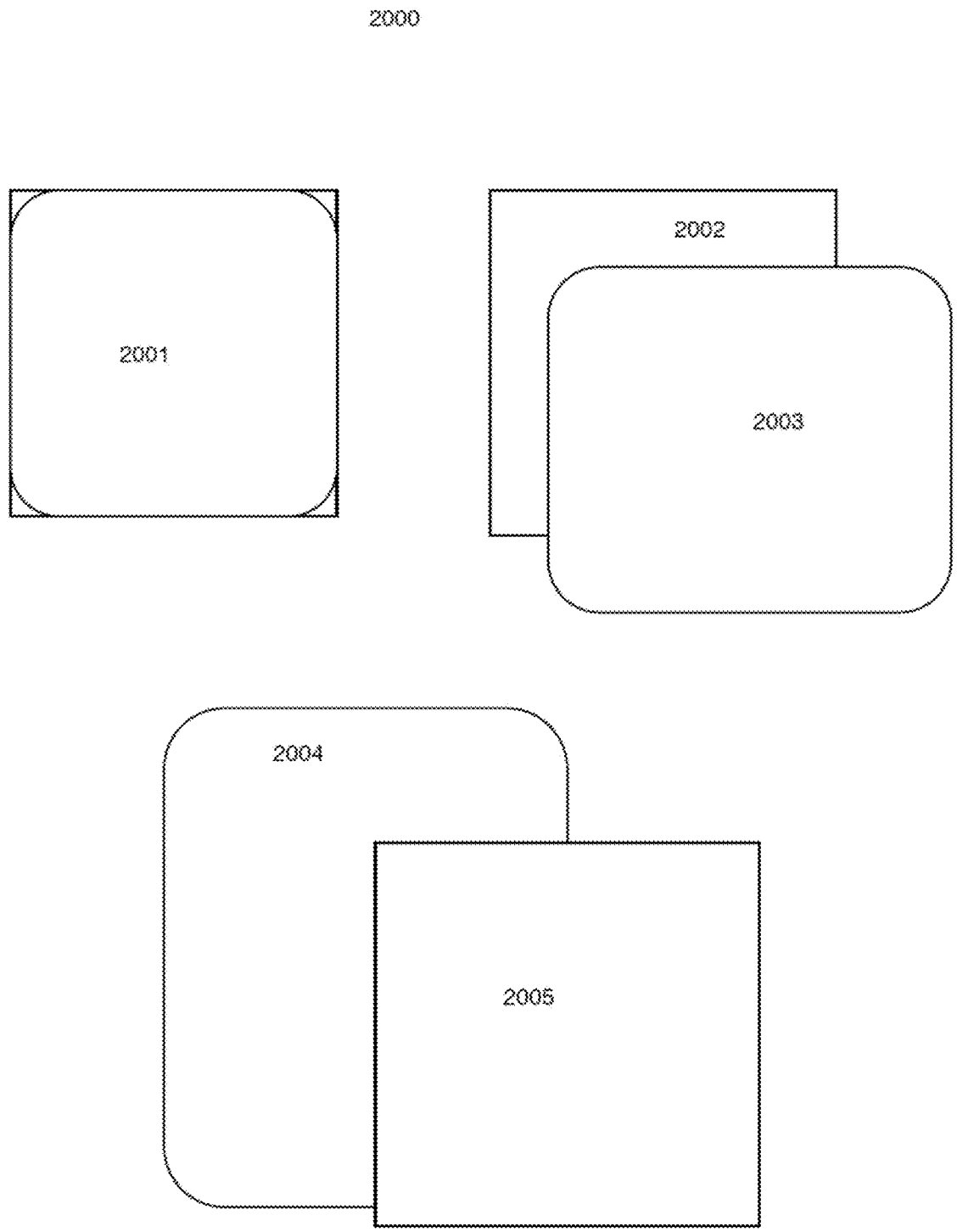
FIG. 20 depicts overlaps between acceptor and donor layers.

FIG. 20 depicts overlaps that sometimes occur between acceptor and donor layers. The width of the front or back covers of a living book varies based on the stacking of the acceptor and donor layers. The layers can be stacked atop each other (bilayer) or intertwined together (bulk heterojunctions). This variation provides an inconsistent amount of molecules on each piece of photovoltaic material and leads to different band gaps between the layers, as depicted in 2000. Acceptors and donor layers can work in tandem with each other 2001 when stacked atop each other as a bilayer structure. In other cases, acceptor layers 2003 can surpass the size of donor layers 2002, or donor layers 2005 can surpass the size of acceptor layers 2004, each of which results in intertwined bulk heterojunctions. Depending on the size of the band gaps, corresponding adjustments can be made to facilitate adequate light absorption and powering of the living book.

Augmented Reality Content

Systems described herein provide extended reality content from newly created and existing media (e.g., physical books, electronic books, and audiobooks) by creating an immersive virtual reality experience. An augmented reality experience intertwines physical environments with the immersive content provided by physical books in conjunction with extended reality. A mixed reality experience enhances the qualities of augmented reality while aligning with electronic books branching under the overall concept of living books.

Figure 6:
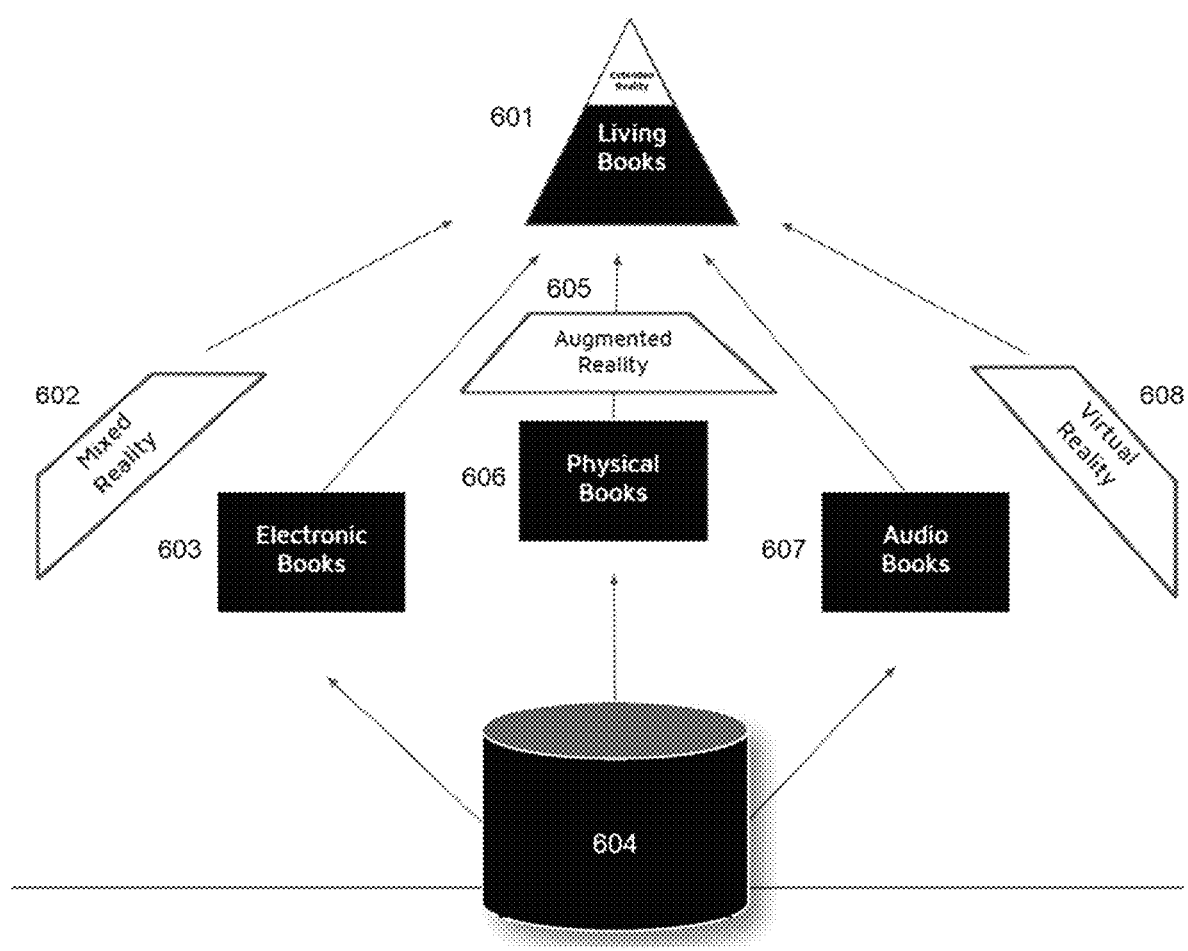
FIG. 6 depicts production and delivery of augmented reality to physical, electronic, and audio media.

FIG. 6 depicts production and delivery of augmented reality to physical, electronic, and audio media. The living book can be derived through multiple facets under the same main mechanism, extended reality 600. Each book medium is specialized under certain aspects of extended reality: physical books 606 fall under the category of augmented reality 605; audiobooks 607 fall under the category of virtual reality 608; and electronic books 603 fall under the category of mixed reality 602. All aspects can be incorporated together to create living books 601. Regardless of the medium, each living book is stored in an online database 604. The online database 604 allows seeking, searching, and retrieval of books upon request, as well as loading of animations and triggers that are relevant to each book medium.

Figure 7:
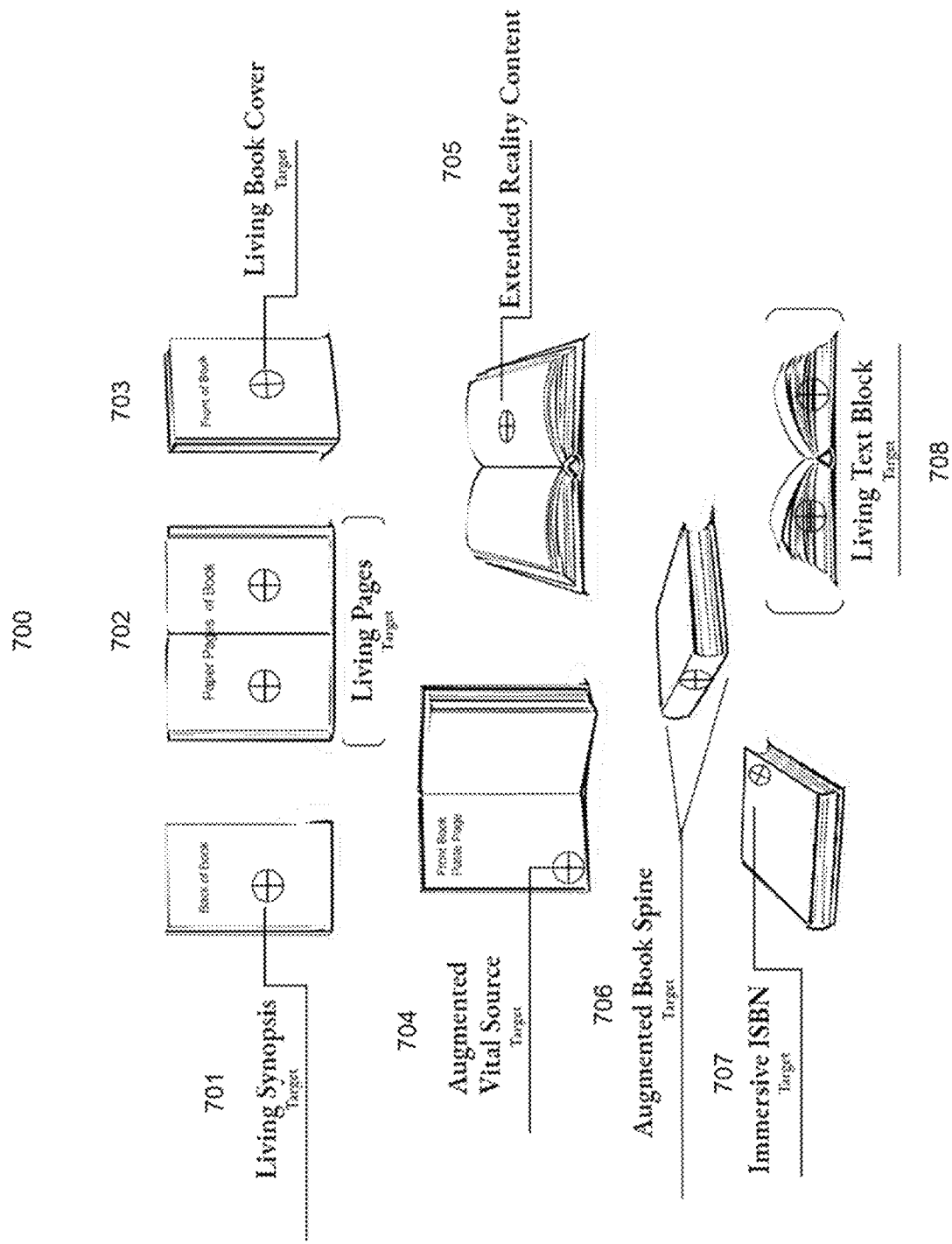
FIG. 7 depicts non-limiting examples of text or graphic media that can be processed by systems and methods described herein.

FIG. 7 depicts several non-limiting examples of text or graphic media that can be processed by methods described herein. Such examples include text or graphic media on a book cover, a cover synopsis, a page of a book, a book spine, and an international standard book number (ISBN). The living synopsis and living front cover are communicatively coupled through an augmented book spine. These components help bring aspects of a physical book to life via augmented reality.

The cultivation of the living book 700 is derived from a multitude of components. The living book synopsis 701 provides a cinematographic depiction of the overall plot of the living book. Once the living book synopsis is triggered, the system prompts a request for the retrieval of the entire book and initiation of extended reality content 705. In this manner, the processing speed can be diminished, and the loading speed can be significantly increased. The living book synopsis 701 provides a brief summarization of the book. In some embodiments, the living book back cover 703 does not load resources in anticipation that the user will not retrieve the book and access extended reality content due to the convention of accessing content through the front cover. The immersive ISBN 707 acts as a form of identification by creating birthplace and a birthdate of the living book, as well as lost book activation. Living pages 702 contain the seeked information that can be superimposed within an extended reality environment. Each living book 700 contains living book pages 702 and a living book cover 703 that are stored with an online database. The augmented vital source 704 acts as a heartbeat for the provided extended reality content 705. The augmented book spine 706 acts as the nervous system for the organic living book. The living text block 708 tracks paragraphs, pages, or sections of the book that a user has interacted with. Additional book features of the living book include text graphics, particular letters, whole phrases, page numbers, paragraph indentations, book headings, book subheadings. Each page of the living book tracks each feature of a particular page, which can be stored in a database.

Living books can be saved in an online database using unique identifiers. Unique identifiers can be produced for each living book upon activation. Activation occurs upon user-directed interaction with a device, for example, by haptical activation of the device. This interaction leads to transmission of signals to an online storage system that conducts Boolean operations dependent on activation or deactivation, inputs records for activation time, deactivation time, and allocation time during a user's session. A solid state battery produces activation and deactivation times when organic photovoltaics cannot absorb adequate light for power. Cultivation of organic living books act as energizers due to light absorption and display printed materials as wireless charging pads.

Activation and deactivation parameters can be incremented based on time elapsed from a previous activation. For example, activation that occurred within the last thirty minutes increments the activation timer, while the latter increments the deactivation timer and queues another document for the next active session. Scheduled deadlines are accounted for on a regular basis. Scheduled deadlines connect polymers or molecules to a microprocessing device, which calculates the amount of pages interacted with thus far and the amount of pages needing interaction to meet a deadline. Scheduled deadlines also compare these page amounts with predefined information containing deadlines, thereby implementing an algorithmic solution for meeting a criteria deadline and creating a pulsating timer that tracks submission time.

Electronic devices must meet the minimum requirements to support extended reality capability. For example, cellular devices require sufficient hardware resources to provide an authentic end-user experience to a user. Android and iOS devices, respectively, have minimum operating system requirements in supporting extended reality, the user's cellular device must be able to meet those requirements.

Figure 27:
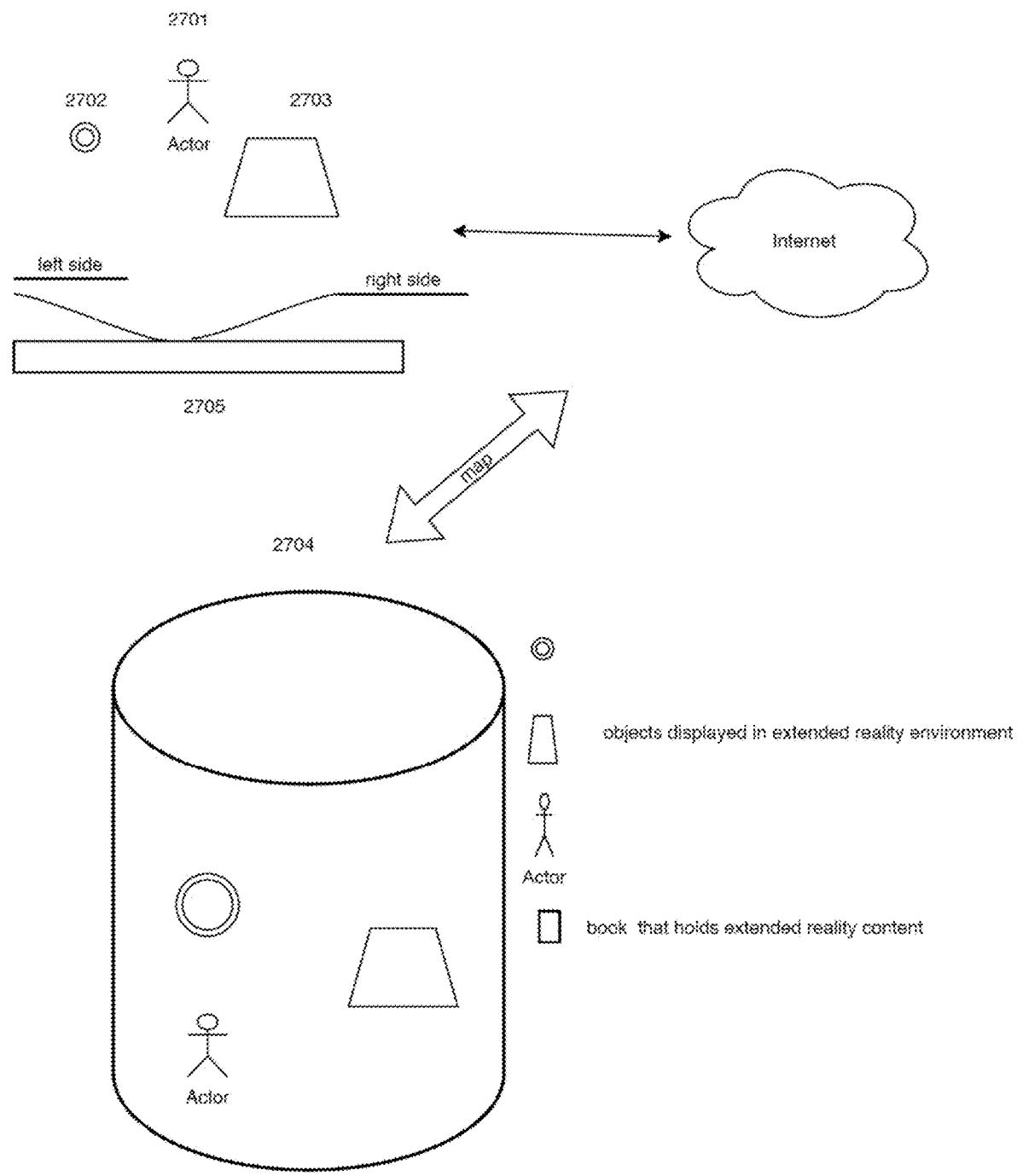
FIG. 27 depicts animations and triggers that occur within an extended reality environment.

FIG. 27 is a diagram that depicts animations and triggers within an extended reality environment. Rendering of animations involves associating a unique identifier for each page of the living book with an animation stored on an online database 2704. Once the user opens the application, the user can request an animation, along with bookmarked data for quick loading. To improve loading speed, each animation can be independently loaded instead of all at once, thereby allowing for quicker user interaction. The information can be used to prioritize the loading of certain animations. In this way, the system can still be in use while loading other assets of the application. The triggers and animations displayed within the extended reality environment 2701-2703 can dynamically change based on the living page 2705 being accessed by the user. The living page 2705 is correlated to the online database 2704 that stores information about the corresponding page.

The extended reality can be implemented with use-context logic such that certain animations are provided or modified based on detected use-context. Use-context can include shaking or movement of electronic devices and user inactivity. The minicomputer within the spinal region along with OPV, allows for a mass variety of use-context logic to be collected.

The extended reality and user system can gather useful data from user interaction. For example, useful data include books that the user may prefer, books that are most suitable for educational purposes, the gender of the user, the age of the user, the genre that the user prefers, etc. Biometric calculations can also be made based on vitals provided through OPV and minicomputer, which constantly transmits and retrieves data as needed.

Figure 8:
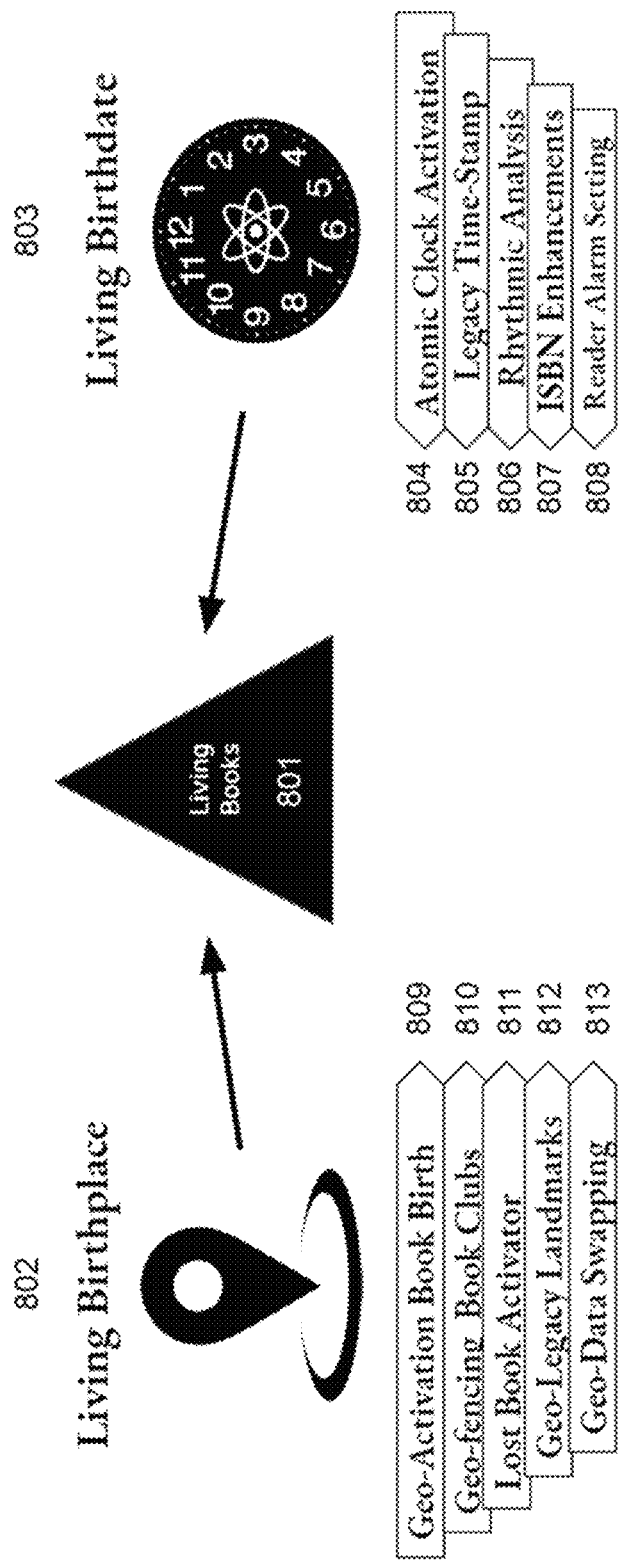
FIG. 8 depicts the location and time based functionality of systems described herein.

FIG. 8 depicts the location and time based functionality of living books. Each living book 801 contains a living birthdate and living birthplace 802 and 803. A living birthplace 802 and a living birthdate 803 form the properties of the living book 801. Non-limiting elements implemented within the living birthdate include atomic clock activation 804, legacy time-stamps 805, rhythmic analysis 806, ISBN enhancements 807, and reader alarm settings 808. Non-limiting elements implemented within the living birthplace include geo-activated birthplace 809, geo-fencing of book clubs 810, a lost book activator 811, geo-legacy landmarks 812, and geo-data swapping 813. The living birthplace 802 and the living birthdate 803 can each act independently and work together efficiently. These features can be continuously and/or simultaneously activated. In some embodiments, deactivation of one or more features results in the initiation of the lost book activator 810.

An atomic clock activation 804 records the living birthdate based on the activation occurrence of each living book, thereby resulting in rhythmic analysis and providing Boolean values for transitioning between states during activation and deactivation.

Each living book on the centralized side contains a geo-activation book birth 809 recording a location based on the first activation of a living book, thereby creating a permanent physical pinpoint. Geo-activation 809 provides the first geographical location where the living book was first accessed. For example, geo-activation can be depicted with a physically pinpointed marker.

A legacy time-stamp 805 tracks of the time that the book was first activated and provides a living birthplace 802 and the living birthdate 803. A time-stamp keeps track of the time that the book was first activated providing a living birthdate.

The lost book activator 811 can be continuously activated until the book is properly retrieved by the original owner.

Users are also provided the ability to geo-data swap 813 extended reality experiences, and thereby learn from each other. Users are provided access to book club conversations through the use of external headsets, along with distributed viable data such as images and triggers, thereby enticing view by potential users. This system allows for augmented peer-to-peer interaction 2400 and 2600, thereby enhancing the knowledge of users of the system. In geo-data swapping, users can gain access to projections within different extended reality environments based on extended reality environments depicted by users within equivalent geo-fenced book clubs.

Geo-fencing book clubs 810 allows the creation of book clubs based on group reading sessions and virtual parameters of a book club location. Virtual parameters can be displayed to multiple users based on device location. Geo-fencing book clubs parametrize book discussions that occur within a virtually geographical space in relation to a user's device and can display results that update in real-time. Users are provided with information about an environment where users can converse with peers and share ideas without the pressures of a traditional learning environment. Users are also provided the ability to geo-data swap extended reality experiences obtaining the ability to learn from each other. Geo-fencing book clubs provide randomized animations that are superimposed in three-dimensional space. For example, these animations can depict book club advertisements, thereby creating a two-way connection between the user transmitting the book club space and the user receiving the book club space. In geo-fenced book clubs, users can project audible conversations within extended reality environments and access the conversations through the use of external headset devices. Additionally, users are provided access to engage in book club conversations through the use of distributed viable data, such as images and triggers, thereby drawing interest from potential users. In the absence of an external headset device, the system can provide muted conversations within the extended reality environment while continuously depicting the visual aspects in real-time.

Living book creators can provide physically marked locations that correspond to historical landmarks based on living book content, as well as the uploaded living books birthplace. Geo-legacy landmarks uploaded living book content can be voted upon by users interacting with the prospective landmark. Upon exceeding a specified threshold of polling results, the living book creator can broadcast findings by initializing a motion towards state officials in creating a newly designated historic landmark. The living book cover can foreshadow events within a book through means of extended reality, thereby providing a cinematographic trailer. The living synopsis summarizes the overall concept of the book, thereby providing an immersive extended reality experience. Through the decentralized architecture, geo-legacy landmarks create physical markers based on the location that a living book was uploaded. For example, a living book based on a historical landmark can be pinpointed. Users can vote on the relevance of the landmark. A living book creator can use voting results to establish a historical landmark.

For example, information can first be assigned a geospatial location or geo-location. Through augmented navigation, information pertinent to the current location of the user device can be delivered. Such information, for example, educational digital content, can be derived from a living library. Data associated with the usage of this content can be further maintained and analyzed. For example, a user first visits a location that is associated with a specific audio or visual media with informational content pertinent to that location. The informational content can include, for example, a narrated history of the location. A digital questionnaire can then guide the user to a subsequent location as a part of a tour. Usage data can then be timestamped, analyzed, and then stored in the cloud.

Figure 11:
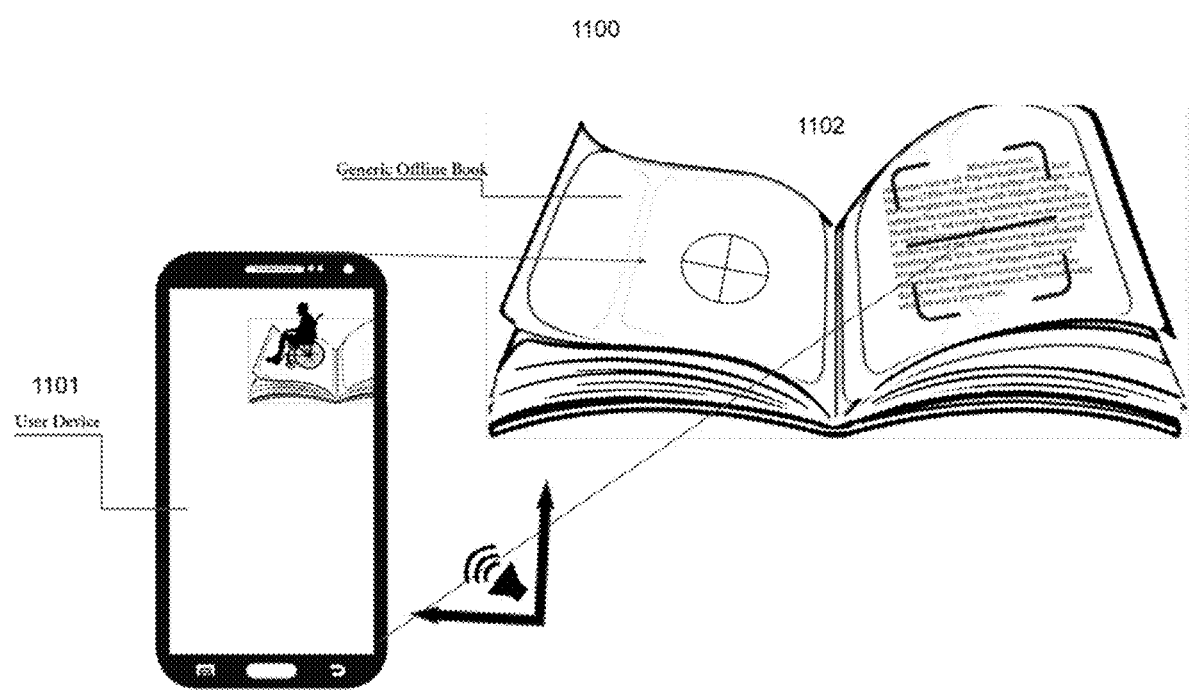
FIG. 11 depicts an extended reality experience through systems described herein.

FIG. 11 depicts a process of conferring augmented reality content to physical media. Text from a physical medium (e.g., a generic offline book) 1102 is captured by a camera of a user device 1101. The text is then processed and used to identify or generate relevant multimedia. If the multimedia is visual, then the multimedia can be superimposed on the same image from which the text is being captured and then processed as a composite image on the visual display of the user device. If the multimedia is aural, then the multimedia is played through the user device speakers.

Augmented Living Library

Figure 9:
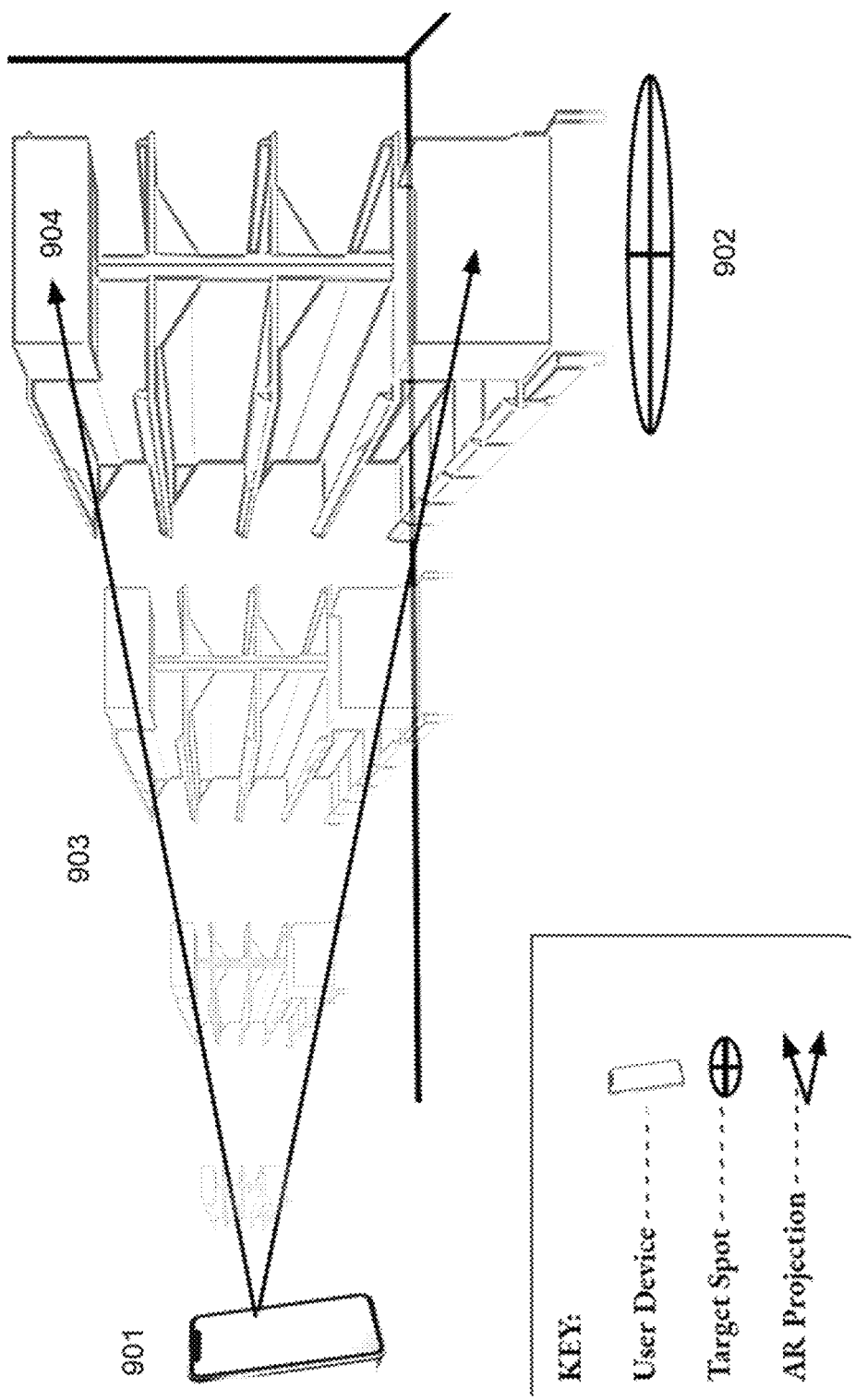
FIG. 9 depicts an augmented reality living library.

An augmented living library is superimposed in three-dimensional space displaying real-time data based on user device location, e.g., an office, a playground, a park, etc. FIG. 9 depicts an augmented living library. The augmented living library 900 is a projection 903 from a user's electronic device 901 that depicts a bookshelf 904 containing all of the user's activated books in three-dimensional space. The bookshelf projection 903 is projected onto a target spot 902 based on the user's preferences. The target spot 902 can be a living room, an office, a park, or any suitable place for projection. The augmented living library acts as a personalized bookshelf that displays living books that are associated to the user. Each living book can be categorically arranged, for example, depending on the type of living book (e.g., physical book, electronic book, audiobook). The scalability of the augmented living library is dependent on the number of items encased in each section. The living library can be a cinematographic depiction of living books prior to user selection, thereby providing opportunity to queue triggers and animations in anticipation of being selected, while minimizing processing power in the event that the book is not selected. The books within the living library can be categorized based on the type of medium.

Multifaceted Interactive Narration (MIN) System

Systems described herein can further include multifaceted interface narration (MIN) artificially intelligent narration system. A MIN artificially intelligent narration system uses artificially intelligent techniques to generate narration based on factors, including, but not limited to, age, subject matter, gender, emotion, ethnicity, tone, pace, style, living occupation (e.g., celebrity, news anchor, etc), and accent. A MIN artificially intelligent narration system can be built upon information stored within a hybrid cloud database along with page scan diagnostics. A hybrid cloud database provides access and retrieval of information based on clustered information as well as individual personal information stored within a database.

Figure 12:
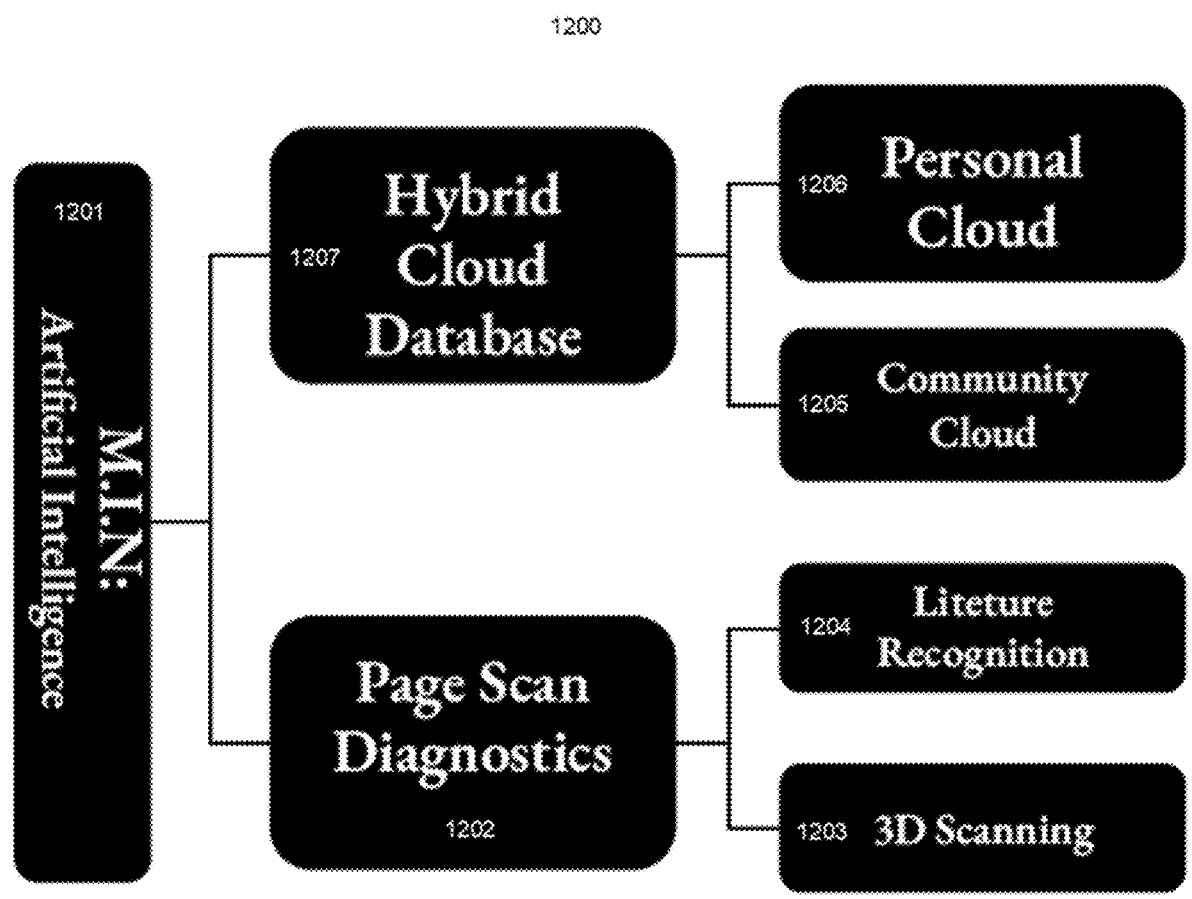
FIG. 12 depicts a multifaceted interactive narration (MIN) system described herein.

FIG. 12 depicts a MIN system. Artificial narration 1200 is determined by MIN artificial intelligence system 1201. Narration along with voice recognition is provided based on a multitude of factors, including occupation, language, dialect, accent, emotion, gender, pace, style, voice age, and voice tone. MIN is based on a hybrid cloud database 1207 that includes personal cloud 1206 and community cloud 1205 databases. MIN is also based on page scan diagnostics 1202 that includes literature recognition 1204 and 3D scanning 1203. Page scanning diagnostics keeps track of credentials that signify a successful page scan 1202. Together, these factors result in amalgamations of interactive narrations.

FIG. 32 provides example attributes of artificial narration that can be determined by the multifaceted interactive narration (MIN) artificial intelligence system. The MIN artificial intelligence system can automatically assign attributes of artificial narration according to the subject matter of the text being narrated. The attributes can include language, accent, dialect, emotion, gender, pace, style, voice age, voice tone, category, and occupation.

Computer Architectures

Figure 10:
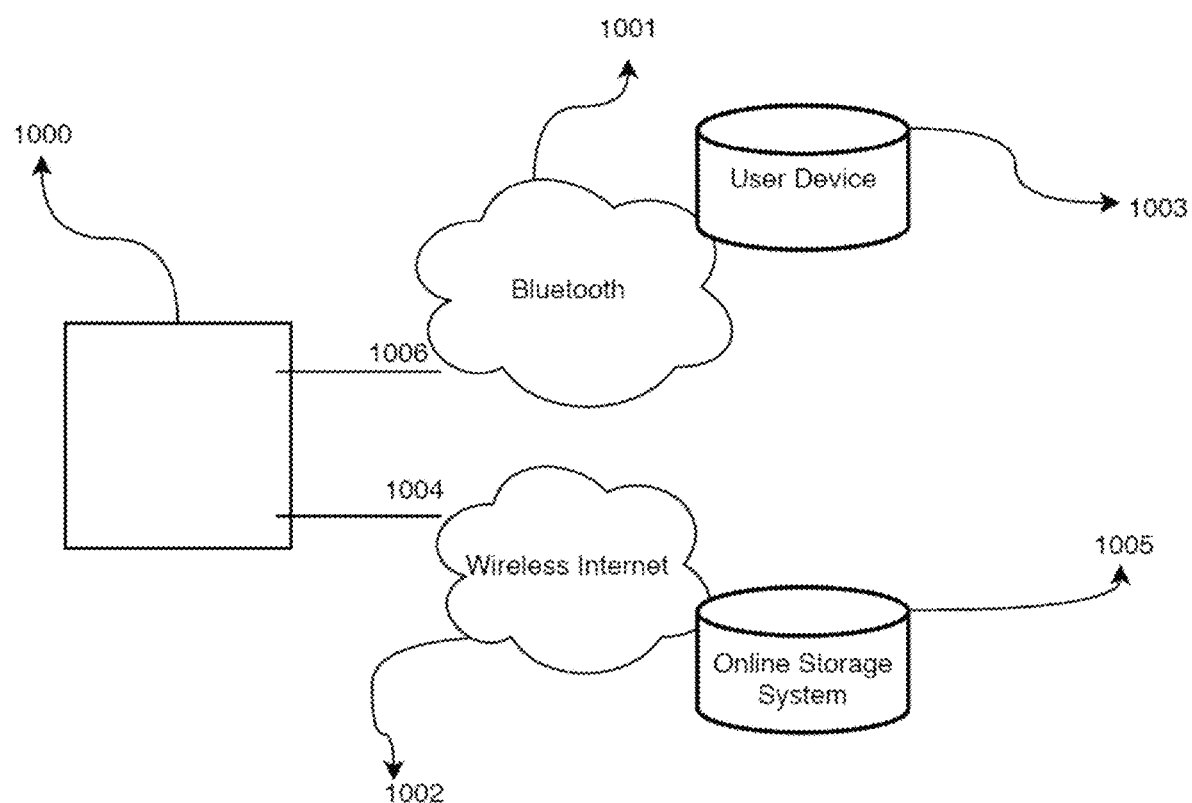
FIG. 10 depicts data transmission through a minicomputer of systems described herein.

FIG. 10 is a diagram showing the transmission of data through the minicomputer. Data is retrieved from a user device 1003 and inputted 1006 into the minicomputer 1000 through the integrated bluetooth chip 1001. The data is then processed and outputted 1004 through the wireless internet chip 1002 and stored within an online storage system 1005.

Figure 13:
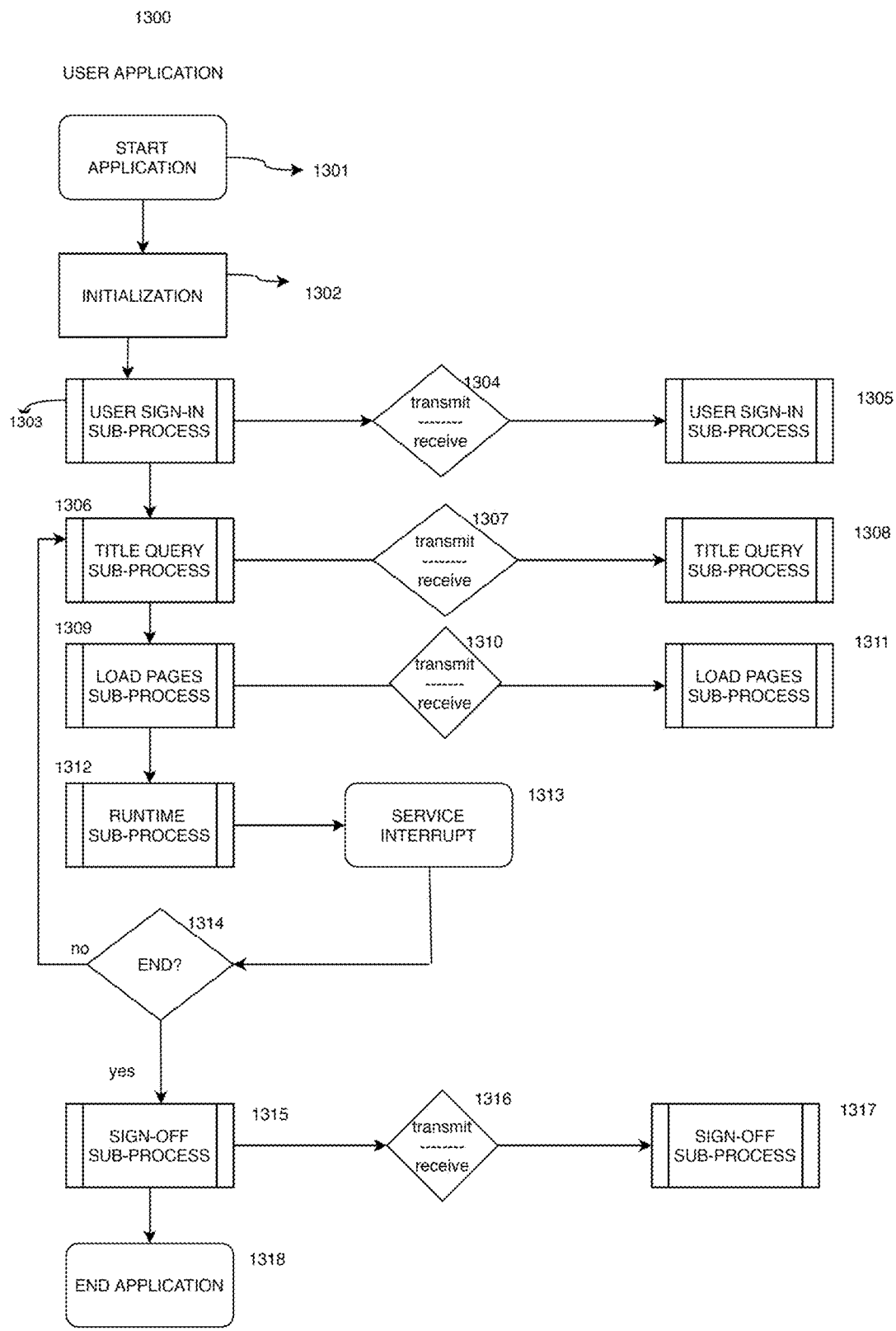
FIG. 13 depicts user progression in an application of systems described herein.

FIG. 13 is a flowchart 1300 that depicts user progression in the application of systems described herein. The operations conducted by the software application works in parallel with the concept of the living book. Upon starting the application 1301 and successfully loading of the application 1302, the user can proceed through a series of sub-processes. The user signs into the application via the user sign-in sub-process 1303. Data is then transmitted and/or received 1304. Upon successful communication of data, the sign-in process is complete 1305. The user is then transitioned to the title query sub-process 1306. Data are then transmitted and/or received 1307. Upon successful communication of data, the title query sub-process is complete 1308. Speed page loading via the load pages sub-process 1309 is implemented once the user selects a title. Data are then transmitted and/or received 1310. Upon successful transmission and receipt of data, the loading of pages is complete 1311. Each living book can be properly loaded and loosely compressed, thereby providing small runtimes via the runtime sub-process 1312 with minimal chance of service interruption 1313. The refusal of any service interruptions 1313 leads to a redirection to the living library 1314. Once a termination request is made by the user, the sign-off sub-process 1315 is conducted. Once an Internet request is successfully made 1316, the user is successfully signed out 1317 and the application sub-process is terminated via end application 1318. Each sub-process can work separately from one another through the use of microservices. When one sub-process fails, resources can be transmitted to other sub-processes while issues causing the failed sub-process can be resolved in the backend. Through constant transmission and receiving of data, sub-process failures can be quickly resolved.

Figure 31:
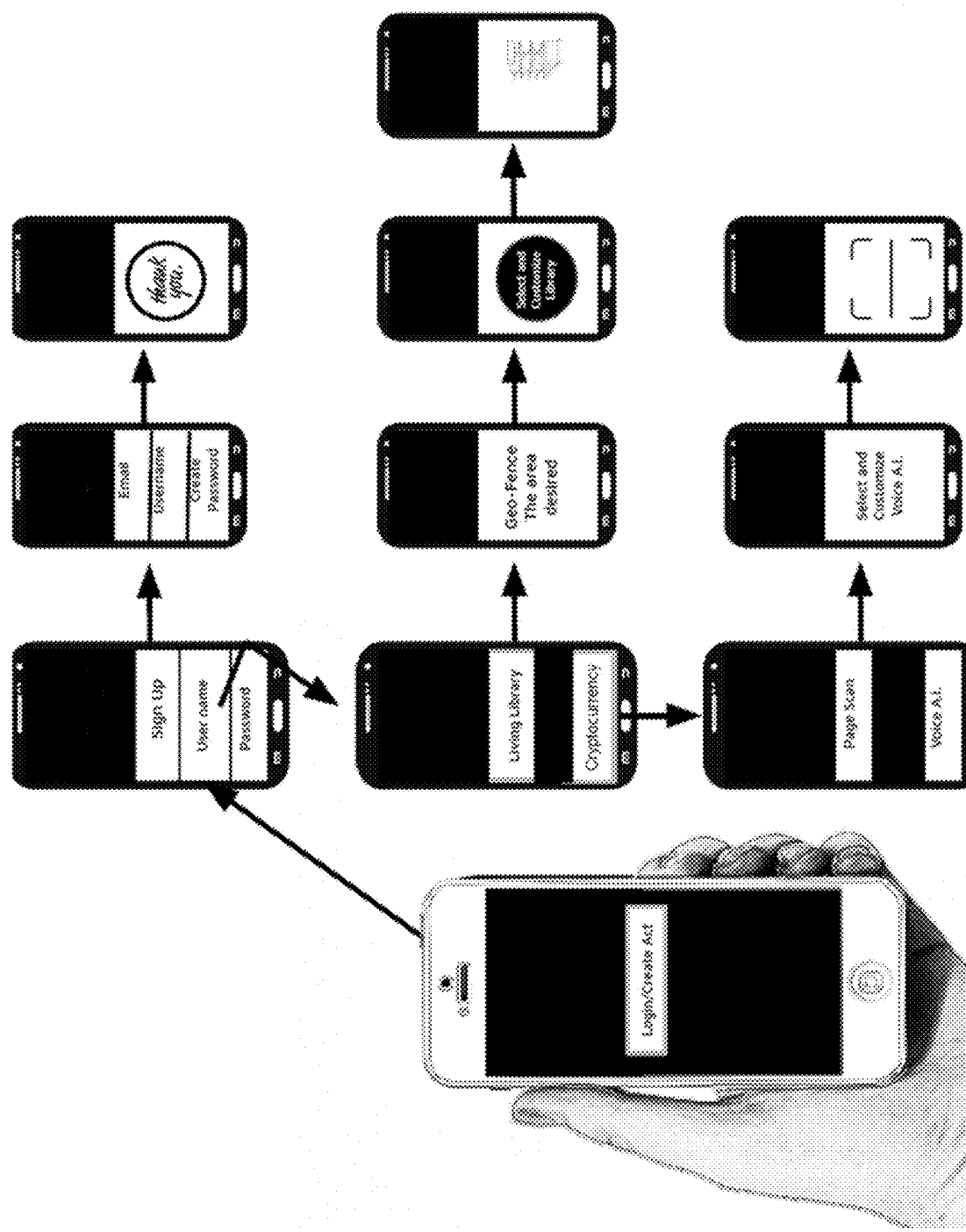
FIG. 31 depicts user experience of an augmented reality media device described herein.

FIG. 31 depicts examples of user-facing aspects, including account creation, media inventory management, and media capture by a camera of a user device. A user can be first prompted to create an account by providing an e-mail address, username, and password, or log in to a pre-existing account. If the user logs onto a pre-existing account, then the user is presented with a menu in which the user can choose to access a living library associated with the user account. The living library can then optionally be parameterized with location dependent functionality via geo-fencing. The visual and audio aspects of the presentation of the living library can be further customized. Alternatively, after logging in, the user can choose to access an interface in which media can be scanned by a device camera. If the scanned media is text media, then the text media can be artificially narrated according to customization by the user or by a process in which the artificial narration properties are automatically determined according to the content of the text media.

Methods described herein include generating and displaying extended reality content on an electronic device. The device can include, for example, a display, an image capture device, a memory storage unit, a detector for sensing movement, and a transmitter. A server processing device can be connected to the electronic device via a transmitter. A database is connected to the server processing device via circuitry. A software application can be stored in the electronic device memory unit. The application can activate the image capture device, display the image received from the image capture device on the display, trigger the image capture device ("triggering the image"), capture an image, and transmit the image via transmission to the server processing device.

Methods described herein include a software method that can determine whether the captured image received from the electronic device corresponds to an occurrence from the pre-existing media by determining whether the unique visual corresponds to unique extended reality record stored in the database. The extended reality record can contain a multimedia file, which can be transmitted to the electronic device. For example, the multimedia file can be a graphic file that contains at least one visual graphic. When triggered for activating the multimedia file (triggering the extended reality), the electronic device runs the multimedia file, renders the graphics on the display on the electronic device, and superimposes the multimedia file, in real-time through the image capture device.

The microprocessing device absorbs the sound waves that surround an area and calculates noise ratios. Areas where inexplicable noise occurs are fed into a function that returns a populated cluster of areas where the noise reduction factor is minimal or non-existent, thereby providing the noise reduced locations based on user preferences.

Internally connected devices can provide linkage to stored annotations, thereby allowing stored annotations to be surfaced anywhere where internet connectivity is established. Transcranial magnetic simulations pulsate electrical currents, thereby transmitting electrical activity between the microprocessing device and extended reality device. Head-mounting displays allow thought processes to be bi-directionally communicated within a storage system. The microprocessing device can contain a playback device that transmits vocally phrased data to an online storage system.

The microprocessing device can hold massive datasets containing living books. The microprocessing device can programmatically map phrases to hand induced communication languages and to different regional languages. The microprocessing device can further include methods that minimize visual impairment effects, for example, by mapping font size increments based on categorization of visual perception, along with highlighted indication of the user location. The microprocessing device can tailor methods for users with learning disabilities, for example, by allowing these users to learn at a slower pace and queuing animations as the user progresses.

Through organic photovoltaics described herein, ultraviolet radiation can be absorbed to assist in the adjustment of light dimness, thereby resulting in animation viewing adjustment.

A microprocessing device described herein can authenticate tangible products, for example, by noting the location of product. The microprocessing device can analyze the packaging and handling of tangible products.

A bluetooth integrated chipset along with a wirelessly integrated chipset can implement artificially intelligent neural networks providing tutorials through narrative capabilities. The microprocessing device, along with a bluetooth integrated chipset, can project a spatially augmented calendar within the extended reality environment to consistent keep a user engaged with scheduled reading requirements.

Simulations can be used to mimic programmatically photovoltaic cell diode models to preserve book light absorption continuously. The microprocessing device along with wireless and bluetooth integrated chipsets can randomize mini-lessons that are taught through extended reality. The microprocessing device can serialize input data containing integers and/or characters via integrated bluetooth chip, thereby outputting deserialized results into an online storage system, and thus, provides a third factor of verification. The microprocessing device can serialize input data provided by the integrated bluetooth chip such that data processed through the bluetooth device is vocally recorded. Serialized results are transmitted into an online storage system to provide an alternative for users to change authentication information, and contact preferences. The microprocessing device can be overwritten, thereby resetting the main memory of the device after powering off the device.

Systems described herein can use discrete mathematical Boolean logic along with implication statements to deduce that global learning retention can be increased. Systems can use linear algebraic concepts in which linear combinations are formulated to justify that global learning retention will be increased amongst all users.

Systems described herein can use mathematical probability distribution functions to determine expected and variance values based on continuous random variables. Through rhythmic analysis and behavioral mathematics, activation parameters can be linearly dependent upon each other. The timer that depicts book deactivation can incentivize for user engagement with the living book. For example, users can be provided an incentive in the form of cryptocurrency for each activation period by the user.

In the decentralized architecture, role authentication can be determined based on a user's specified role, for example, a master or a creator. Feedback that is relevant to a user's current role can be displayed. A circularly linked list can allow conduction of a hierarchical perspective, thereby allowing users that are classified within specified roles to communicate across all spectrums if necessary. Living book masters can be provided with a collection of reports on user engagement with printed materials. Uploading of animations are cross-referenced through a database of ethical and viewable content. Uploaders are provided confirmation and timely updates based on the progression of their uploaded content. Progression depends on the amount of immersive content provided. In some cases, progress does not exceed an extraneous amount of time. Uploaded content can be automatically clusterized within specific genre types. Users are automatically informed of newly created content. Living book masters can filter content such that content is inaccessible to non-representative users. Living book content can be automatically provided with a phantom copy, thereby allowing persistence of data amongst multiple facets. Alterations provided by living book masters can be binarily synchronized. Living book content file extensions can be required to adhere to certain extension requirements. Progression bars can be constantly run in the background by informing living book masters of their contents uploading status. Content uploaded structures can remain intact and adjust to the device's processing power. Content creator products can be randomly advertised throughout the spectrum of the extended reality environment. Uploaded content satisfies pre-defined parameters of the system. Living book content uploaded scalability can be dependent on the device used. Content uploaded renerability can remain consistent with reading content. Living book content submission can be verified within a timely manner, thus progressing the content uploading process.

Figure 14:
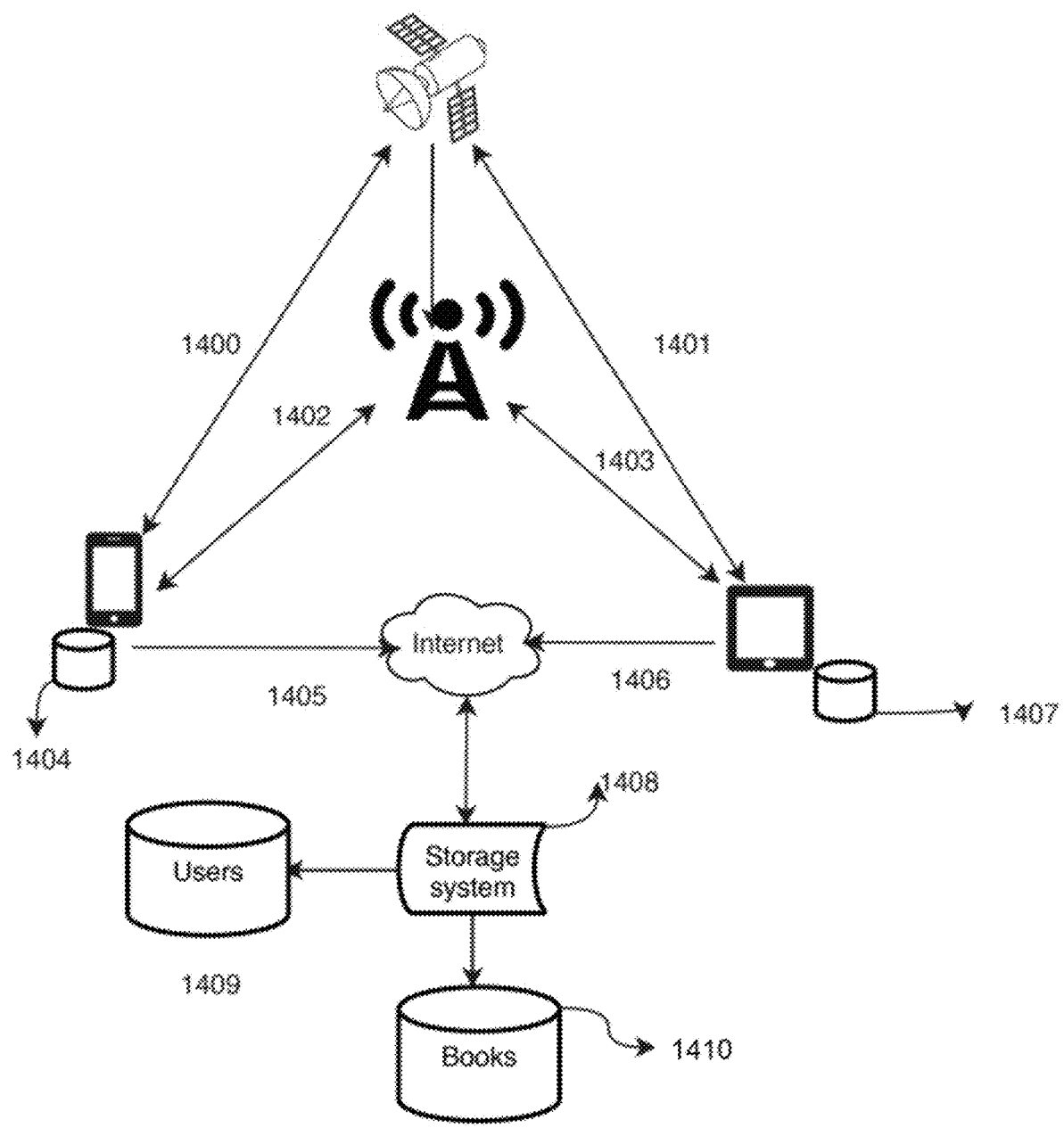
FIG. 14 depicts two-way communications between multiple electronic devices and the online storage system.

FIG. 14 is a network diagram that depicts connections between multiple electronic devices and the online storage system. Devices connect through satellite 1400 and 1401 or cellphone towers 1402 and 1403 to make Internet requests 1405 and 1406. Despite different processing speeds and storage capabilities, all devices maintain sufficient space to access the required services 1404 and 1407. A two-way communication can occur between electronic devices and the online storage system 1408, which stores references to users 1409 and books 1410. Each book contains a unique identifier dependent on the user's instance. Each user can only view the books that are within a personalized database, thereby preventing manipulation of books among other individuals and the corruption of entire files.

Systems can described herein contain service-oriented architecture that is centralized and decentralized. The systems can generate and deliver extended reality content through the use of augmented reality, mixed reality, or virtual reality. A subsystem microservices architecture based on a polyglot approach, shifting from the traditional monolithic architecture, can allow for the introduction of multiple programming languages.

Figure 15:
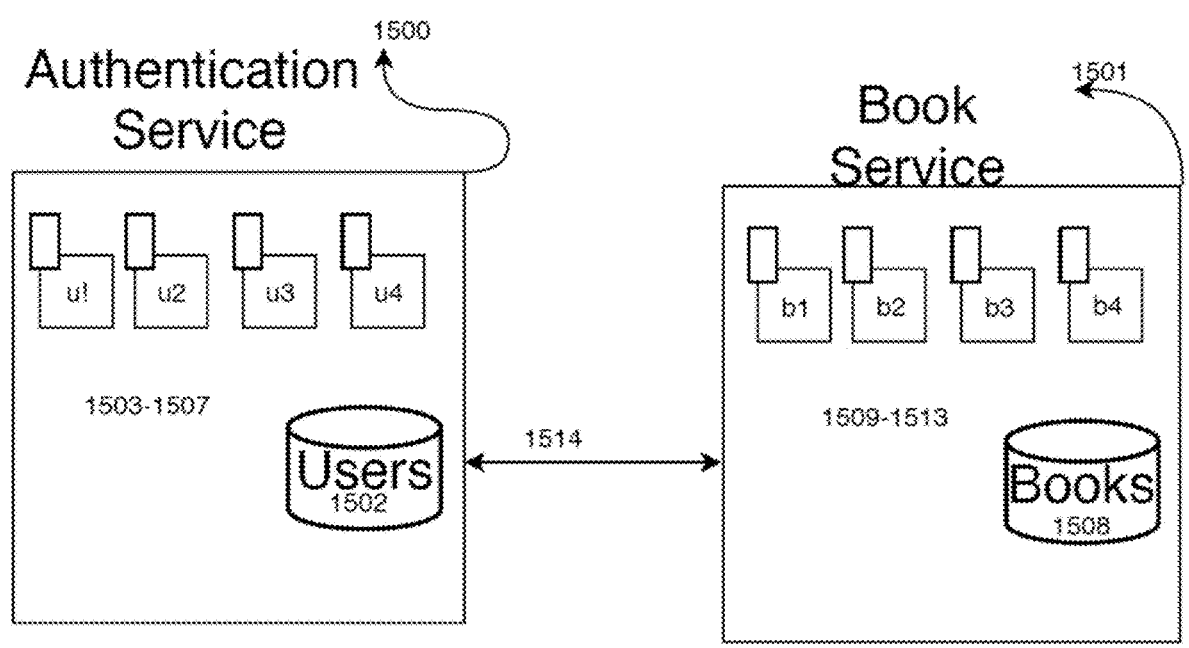
FIG. 15 depicts two-way communications between authentication microservice and book microservice.
Figure 16:
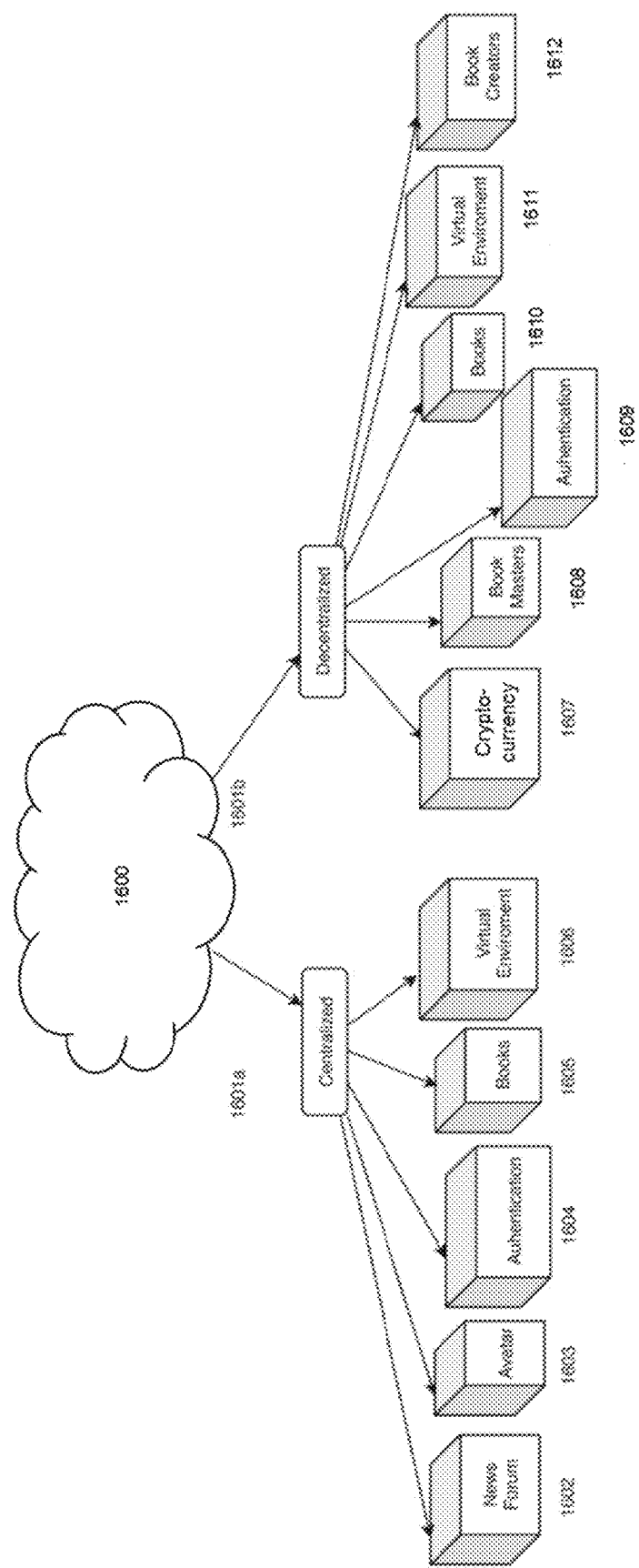
FIG. 16 depicts centralized and decentralized microservices implemented by systems described herein.

FIG. 15 depicts two-way communications between authentication microservice and book microservice. FIG. 16 depicts centralized and decentralized microservices implemented by systems described herein. As depicted in FIGS. 15 and 16, each component in the software application is a separate microservice 1500 and 1600. A bridge exists between the centralized and decentralized side 1601a and 1601b. Microservices power both sides, thereby allowing each microservice to communicate with each other without modification of data within other microservices. Thus, the centralized and decentralized sides can be separately containerized, while being able to conduct two-way communications.

Users created within the authentication microservice 1503-1507 remain static among the occurrence with other microservices, with each user being held within the user database 1502. The login credentials of a user, for example, cannot be changed within another microservice; data persist throughout visiting each microservice. The authentication microservice contains a two-way communication 1514 with the book microservice 1501. Multiple books 1509-1513 can be created within this microservice and stored within the books database 1508. Each user has access to individual copies of the book via the book microservice 1501.

On the centralized side 1601*a*, microservices include, but are not limited to, news forum 1602, avatar 1603, authentication 1604, books 1605, and virtual environment 1606. On the decentralized side 1601*b*, microservices include, but are not limited to, cryptocurrency 1607, book masters 1608, authentication 1609, books 1610, virtual environment 1611, and book creators 1612.

Systems described herein can further include behavioral mathematics that are intertwined with organic photovoltaics, thereby providing a collection of parameters that simultaneously run to determine living book activation. If one or more specified parameters are no longer running, a lost book activator is initialized.

FIG. 17 depicts the activation and deactivation of a living book. Database records are initialized based on the number of activations and deactivations that occur between user sessions. Multiple factors are implemented pertaining to activation and deactivation. OPV tracks activation of the tangible product, i.e., the living book. Upon activation of a book 1700 and 1701 by touch, activation time can be logged. Activation by touching also serves as a form of user engagement. Boolean logic can be conducted to track activation 1702 or deactivation 1703 by binary values of 1 or 0. If deactivation time is greater than thirty minutes, a new record is created to mediate the new activation that may occur during another session. If activation is less than thirty minutes, activation is incremented, which allows for one big record, for example, for when a user constantly switches from holding the living book and not.

Bi-directional communication can be established to transmit data constantly that handle data decryption and encryption based on directional flow. A bi-directional circularly linked list of nodes can allow for each individual microservice to act as an individual component, while providing communication with other nodes. A variety of frameworks enclosed within each microservice allows each service to perform corresponding actions. The system can include security measures that encapsulate data within the microservice created therein, thereby allowing transmission of necessary data between microservices and implementing continuous development and continuous integration techniques to provide constant building and deployment. Each microservice is dockerized to independently containerized each microservice.

Vocal Recognition System

Systems described herein can include a speech signal as an input, which performs vocal recognition to generate vocal recognition result information, including multiple candidate sentences and ranks of the respective candidate sentences. Multiple candidate sentences included in the speech recognition result information can be processed according to a predefined machine learning model. The machine learning model can re-rank the multiple candidate sentences by selecting a highest ranked candidate among the re-ranked multiple candidate sentences as a vocal recognition result. The machine learning model can be learned in advance.

Figure 18:
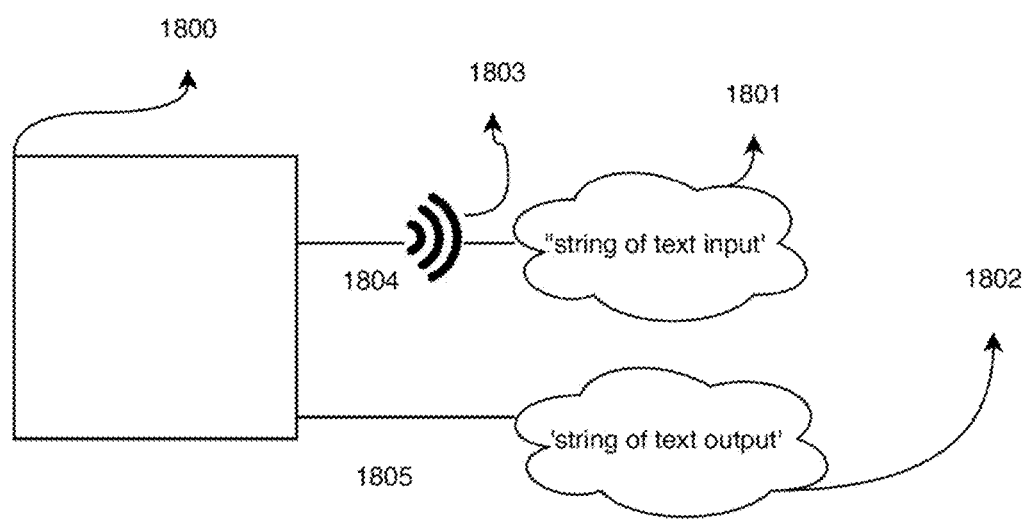
FIG. 18 depicts a vocal recognition system described herein.

FIG. 18 is a block diagram that depicts a vocal recognition system. Voice recognition is a key component in multiple aspects of the systems described herein. For example, voice recognition acts as an interactive tutorial component to familiarize a user with the application interface and functionalities. Voice recognition provides a multitude of functionalities including, but not limited to, automated assistant, pronunciation assistant, speech recognition, and word phonemic breakdown. For example, speech patterns of prominent figures and historical figures can be provided through voice recognition. Audible phrases 1803 provided by electronic devices 1801 are inputted into minicomputer 1800. The phrases are serialized 1804 into minicomputer 1800 with machine learning algorithms and results that match a specific individual are quickly outputted 1802. Regardless of the vocal input provided, vocal recognition provides users with the capability to annotate notes through voice and save them on an online storage system. The data within the minicomputer 1800 is then deserialized 1805 and a vocally recognized response that is dependent on the specific interaction is then outputted 1802.

The vocal recognition result information can be transmitted from a predetermined external server. The vocal recognition result's naturalness and similarity values are equivalent among other datasets. The vocal recognition result's spectrograms emit visual sound waves representing vocal output. The active input elicitation component generates at least one vocal recognition result. The receiving vocal stream and the control stream in a multiplexed stream from the client. The multiplexed stream received from the client can be demultiplexed to produce vocal stream and control stream. An encrypted speech stream and an encrypted control stream can also be received from the client. The encrypted vocal stream and control stream can be decrypted. The vocal recognition feedback module can generate feedback data to modify the vocal models based on the feedback data to improve the performance of the active input component. Feedback modules include a weighting for possibilities based upon the feedback data. The system can also receive an acoustic sequence that represents an utterance. An utterance can include a respective feature representation at each of a plurality of time steps. The system can further produce the acoustic feature for the time step through each of one or more recurrent neural network layers to generate a recurrent output for the time step. The phoneme output layer generates a set of scores for the timestep. A respective score can be generated for each of the plurality of vocabulary phonemes and a blank character phoneme. The score for each vocabulary phoneme represents a likelihood that the vocabulary phoneme represents the utterance at the time step. The blank character phoneme represents that the utterance at the time step is incomplete. From the phoneme representation for the acoustic feature representations at each time step, a respective pronunciation can be extracted for each of one or more words. One or more words can be delimited by splitting the phoneme representation using the hyphen symbol. The language interpreter component can interpret the received user input using at least a subset of the representations in the active ontology. The active ontology can be instantiated for each user session. The services orchestration component can call at least one service using at least a subset of the representation in the active ontology. The plurality of audio inputs can include answers to questions posed by one or more synthetic characters. The plurality of audio inputs can include a narration of text. The plurality of spoken outputs from one or more synthetic characters can include commentary to the narration. The system can further acquire a textual description of the narration that is in alignment with the spoken outputs deciphered by the system. The system can further determine a responsive audio output that includes user personalization data based on a plurality of responses from the user. Inter-character dialogue can be preferred over user-character dialogue. Icon modifications can occur to reflect the determined operation in real-time.

Communication Systems

Figure 21:
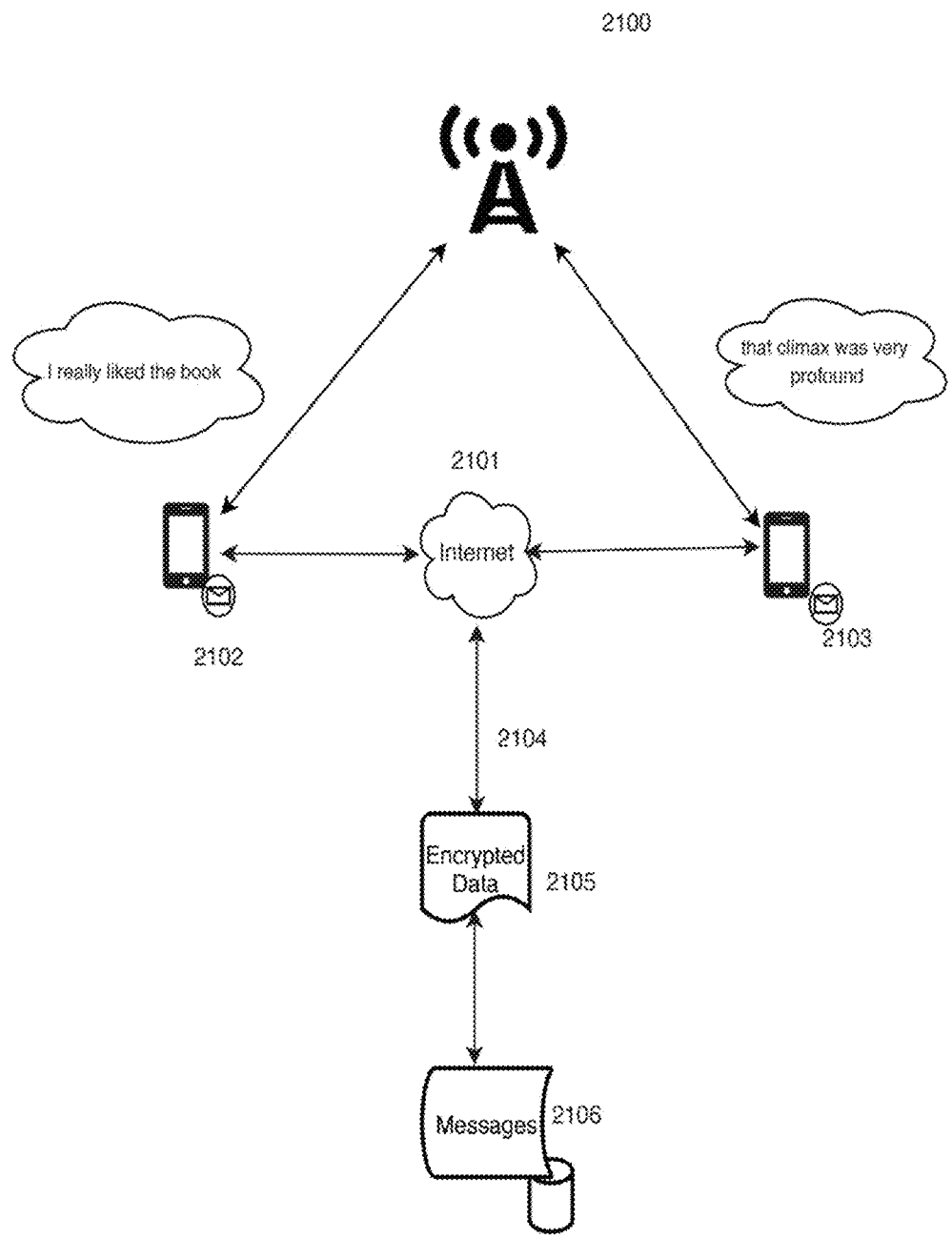
FIG. 21 depicts transmission of encrypted and de-encrypted messages.

FIG. 21 is a network diagram 2100 that depicts the transmission of encrypted and de-encrypted messages between electronic devices and a message database. Message boards facilitate conversations between users and allow users to communicate personal experiences with the augmented environment. Message board conversations can be logged and encrypted 2105 to avoid third party accessing of data and can be stored within a database 2106. Encryption and/or decryption of data can occur upon transmission or receiving of data 2104. Decryption of data can track information and feedback from user conversations to enhance the user experience. Peer-to-peer interaction can occur when packed messages are distributed between users over the Internet 2101. User devices 2102 and 2103 facilitate processing of peer-to-peer conversations.

Users can be provided constant, real-time information through the use of news forums and push notifications 2600. The news forum can update users with information about the system, user feedback to keep users engaged, important updates that drastically impact functionality of the application, etc.

Figure 26:
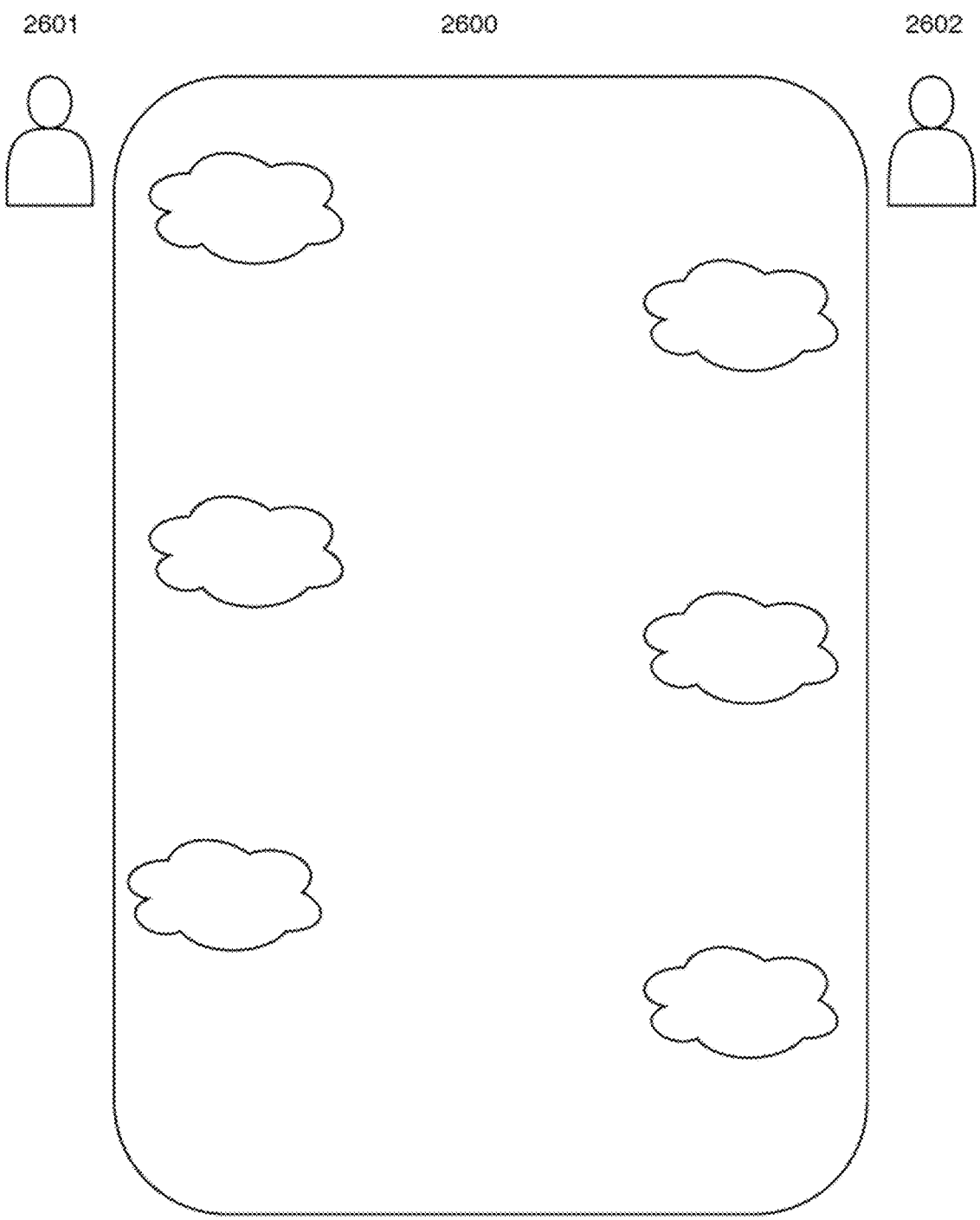
FIG. 26 depicts communication of messages within an extended reality environment.

FIG. 26 is a diagram that depicts the communication between users and systems described herein. Users 2601 and 2602 are provided constant, real-time information through the use of news forums and push notifications in three-dimensional space 2600. News forums acknowledge significant current events to inform users constantly of vital information. Users can be reminded of events that are occurring at random schedule intervals and user involvement. The news forum updates users on information about the system to engage users and provide important information, for example, information about system updates that can impact the system's functionality. Push notifications further engage users and provide important information, for example, information about upcoming projects, updates, and reminders about previously bookmarked locations. The news forum and push notifications provide an augmented peer-to-peer interaction, thereby resulting user engagement and retention.

The extended reality system described herein can provide bookmarked information, thereby allowing users to save animations, page visits, interactions, avatars, and other features of the extended reality experience. In this manner, previously bookmarked items can be retained and retrieved upon user access to the application during succeeding sessions. Bookmarked information can be used in determining and providing relevant push notifications to users. When a user bookmarks something (e.g., the last page visited, the last animation interacted with, etc.), the system initiates randomized push notifications to encourage user reengagement.

A newly three-dimensional vector space can be created to facilitate communication between users, as well as other independent variables of the system. Organizational groups can be built based on members that have similar preferences in reading material. Organizational groups can be provided reading recommendations based on the overall group consensus. Organizational groups can randomly acquire book recommendations. Organizational groups can establish roles based on member involvement. Members of organizational groups can be notified of meetings that occur with organizational meetings. Members of organizational groups can be automatically encapsulated within an environment that includes all members of a group. Members of organizational groups can be notified of each other's online presence within an extended environment. Users can be recommended to join organizational groups based on user reading preferences. Member involvement within an organizational group can be tracked via graphical means.

A newly created vector space can continuously transmit information between the extended reality environment, thereby allowing communication between users and leading to user conversations regarding a variety of topics. The newly created vector space can be adjacently mapped to the extended reality environment, thereby allowing for the easy retrieval without disrupting the learning experience. The newly created vector space can be mobilized within an extended reality environment, thereby allowing the newly created vector space to be placed in suitable location based on user preferences.

The newly created virtual environment can transmit encrypted messages between two and/or multiple communicators to keep messages private between the involved parties. The newly created virtual environment can decrypt messages from an online database occurs and evaluate messages for feedback purposes and content enhancement. The landscape can change based on the premise of the medium provided in the extended reality environment, thereby providing a more immersive experience. Three-dimensional objects can be manipulated within the environment without disrupting the overall contents within the extended reality environment.

The newly created virtual environment can allow for creation of mini-games within the environment. For example, these mini-games can quiz users on information learned through the extended reality experience in an interactive manner. A collection of results can be stored and displayed based on user mini-game analytics, which initiates a competitive willingness to obtain a higher score. Randomized trivia mini-games can also be created, thereby allowing users to learn new information in a non-interactive way.

Users can be represented by three-dimensional avatars that communicate through peer-to-peer socket connectivity. The avatars can interact with historically accurate and prominent figures throughout history. Figures can be made more realistic by the incorporation of voice, thereby allowing users to learn from prominent figures in real-time.

User avatars can also communicate with other avatars within a virtual environment. Message boards can facilitate conversations between users allowing them to communicate their experience with the augmented environment, their interpretations of the book, etc. Message board conversations can be logged and encrypted to avoid third party access to the data. Decryption of data can occur to track information being conversed so that the system can provide improved user experience based on user feedback. User avatars can also communicate with prominent figures of the living book. Books that take place in significant environments can have three-dimensional versions of prominent figures that can communicate with avatars using original voices.

Haptic devices allow user interaction with other avatars and prominent figures within the extended reality environment. Haptic devices provide user interaction with three-dimensional avatars within the extended reality environment. Tactical sensation provided by haptic devices can simulate vibrational actions, for example, during significant changes within the extended reality environment. Tactical sensation provided by haptic devices can benefit users, particularly those with physical appendages. Tactical sensation provided by haptic devices can allow users to participate in historical events, thereby enhancing user understanding of these historical events. Tactical sensation provided by haptic devices can be indirect. Tactical sensation provided by haptic devices can pertain to vital metrics. Tactical sensation provided by haptic devices can allow users to engage in practical extended reality experiences.

Avatars can automatically appear within a newly created virtual environment. Avatars can be in the same extended reality environment as other users in real-time. Avatars can implement question and answer responses; a multitude of avatars can provide explanations to user questions within an extended reality environment. Avatars can map responses to the environment created therein and persist among other avatars. Avatars can modify responses as necessary. Avatars can be developed through facial detection and eye detection criteria that are set at the initial state of the extended experience.

Avatars can be developed through character creation menus or facial scanning. Facial features can be implemented based on user preferences. These features can be immediately deleted after the avatar is created. Facial features can be persistent throughout multiple sessions and only modified when a user actively manipulates data from prior sessions.

Thesaurus/Dictionary System

A phantom copy can be created based on a book that is viewed through extended reality. While the phantom copy is parsed by a user in real-time, vital factors can be tracked to identify user hesitation. Accordingly, a list of similar terms or phrases can be populated to the user's account for the hesitance logged. A ranked list of similar terms can be created based on a polyrepresentation of documents within the virtual environment. The system can also indicate vocal phonetics of the originally defined term, thereby providing an outlet for user understanding of complex vocabulary. A ranked list of similar terms can be color-coded to signify the intensity of each word used and can be arranged based on context. Individual terms provided by a ranked list of terms can be draggable and can overlap initial terms, thereby turning statically defined sentences into dynamically defined sentences. This feature allows users to observe the manipulation of synonyms within the virtual environment.

Figure 22:
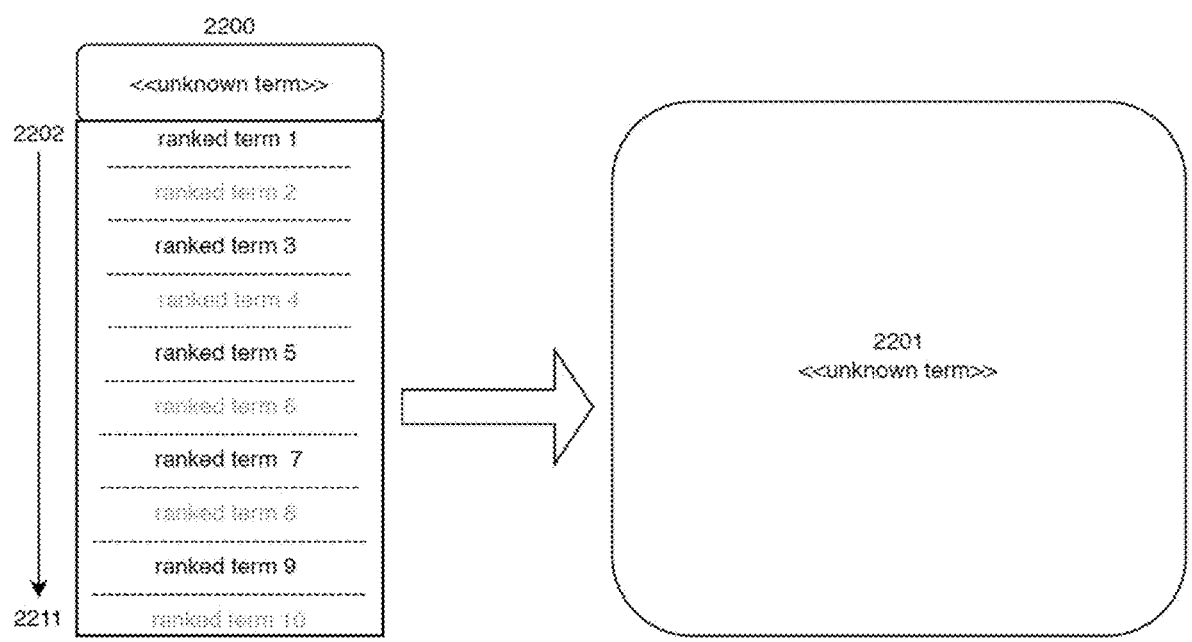
FIG. 22 depicts the projection of synonyms for an unknown term that is found within the living book.

FIG. 22 is a block diagram that depicts the projection of synonyms for an unknown term that is found within the living book. A phantom copy of the physical book can be created and stored on a storage system. The phantom copy keeps track of each living book and living page such that the phantom copy resembles a physical copy of the book. If a user expresses difficulty in understanding the meaning of a word, for example, by detected user hesitation, the system provides a list of synonyms 2200 to aid the user's understanding of unknown term 2201. While the user scans a physical copy of the book, the phantom copy can track these unknown terms based on user interaction with the system. The system then provides a list of relevant words 2202-2211. Separate phantom copies can be created for each individual user, thereby creating multiple phantom copies of a book for each individual user.

Uploading Content

Figure 23:
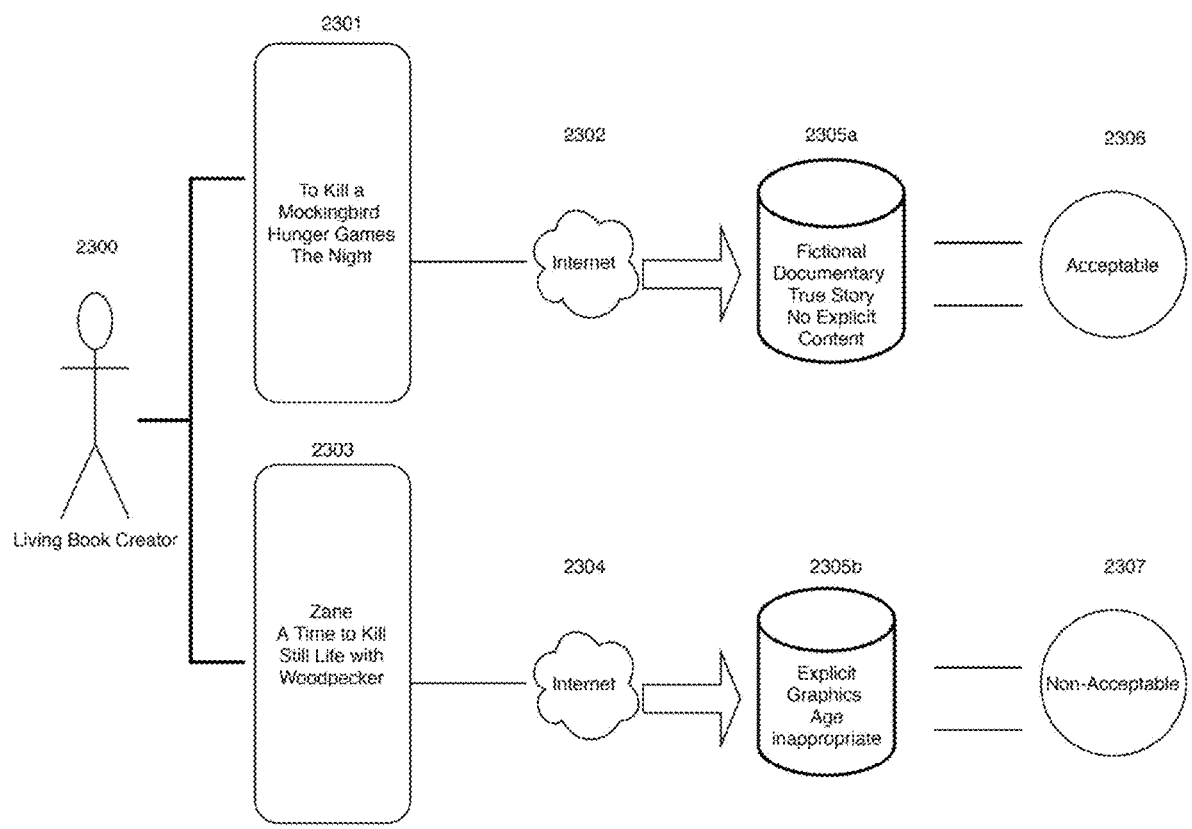
FIG. 23 depicts processes for uploading living book content.

FIG. 23 depicts processes for uploading living book content. On the decentralized side of the system described herein, living book creators 2300 can generate living book content and acquire access to upload living book content. Upon uploading content, an HTTP request via the Internet 2302 and 2304 can be made to obtain living book content. The uploaded content can then be cross-referenced with an online database 2305a and 2305b to determine whether the content is appropriate. Living book content that is determined to be appropriate can be accepted 2306. Living book content that is determined to be inappropriate is not be accepted 2307 and is not be uploaded. Content deemed to be inappropriate can be based on pre-set criteria. Content can be displayed to the living book master for review before uploading. Uploaded content can be categorized or clustered into specific genres depending on the subject of the uploaded material 2301 and 2303. The uploader can be informed of when uploaded content becomes live and of frequency of user engagement within the uploaded content.

Facial Recognition System

Facial detection and eye detection allow for creation of an avatar in a user's virtual environment. The avatar can communicate with other users within the same virtual environment through message boards and forums about content, opinions, and other relevant topics. In some embodiments, facial features are only used for creation of an avatar. Users can provide consent and approval prior to initiation of facial detection. Immediately upon avatar creation, the facial features can be garbage collected for security purposes.

Figure 25:
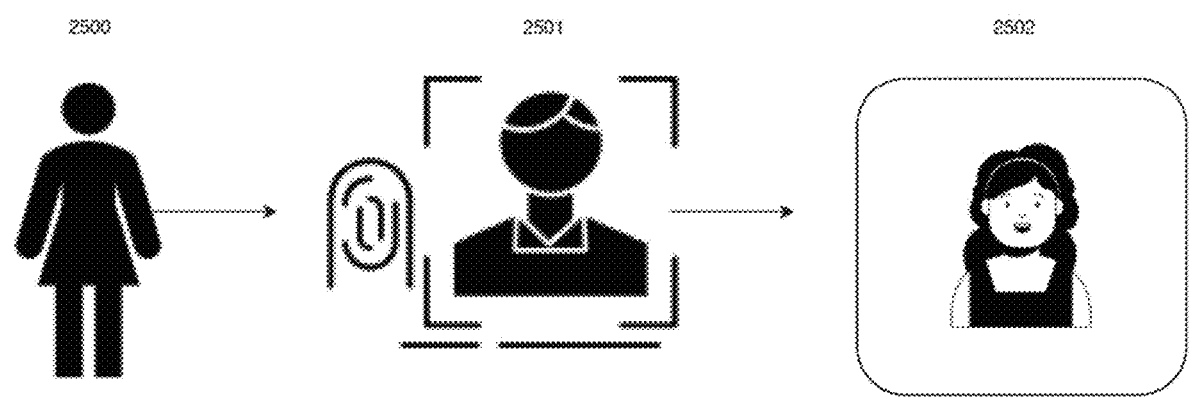
FIG. 25 depicts a facial recognition system described herein.

FIG. 25 is a block diagram that depicts the usage of facial recognition in the creation of a three-dimensional avatar within the extended reality experience. Facial features 2501 provided by a user 2500 are analyzed and processed to create a three-dimensional avatar 2502 of the user.

Haptic Feedback System

Figure 28:
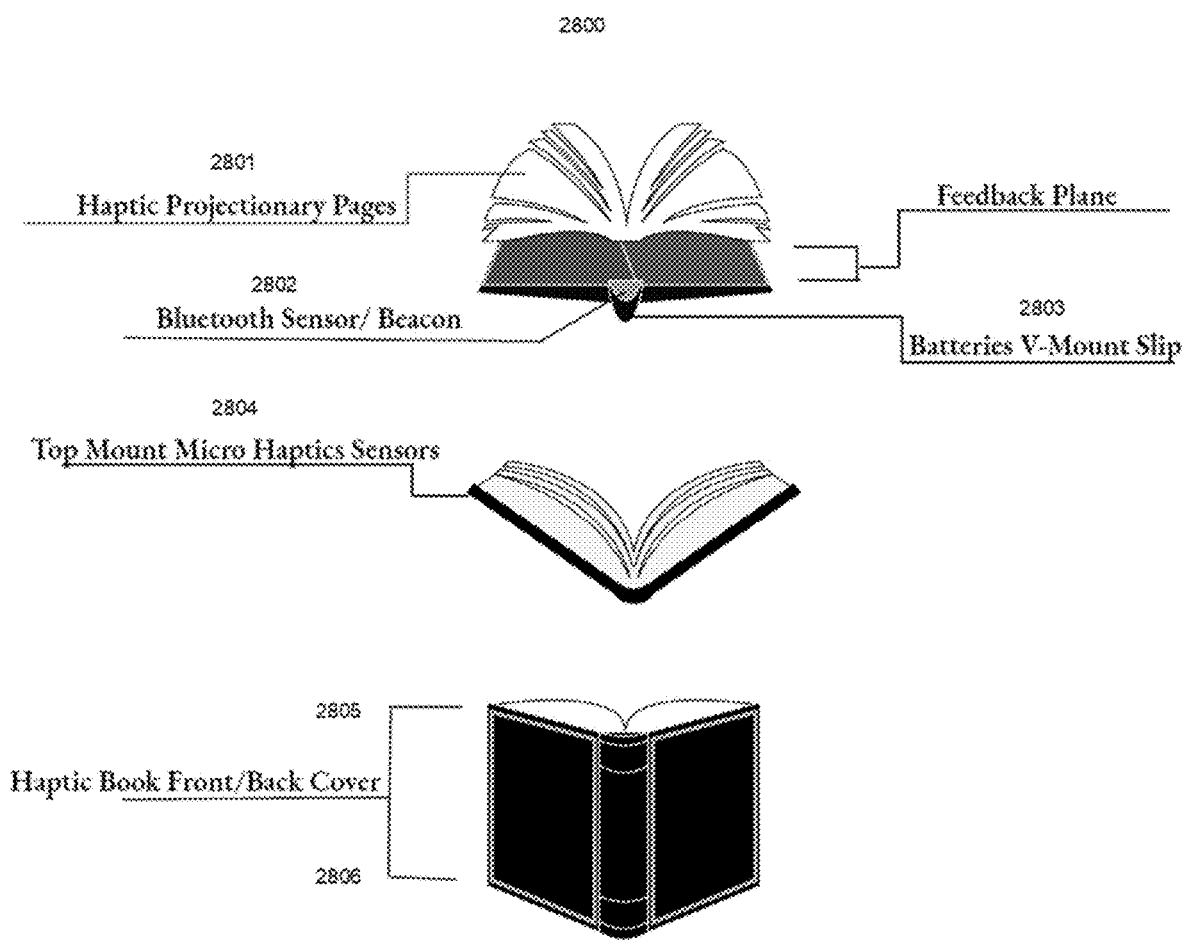
FIG. 28 depicts a haptic feedback system described herein.

Systems described herein can include a haptic feedback system. Haptic devices provide tactical interaction with objects within the extended reality environment. FIG. 28 depicts a haptic feedback system 2800 that delivers augmented reality content. The haptic feedback system 2800 includes a haptic book cover and back cover 2805 and 2806, top mount micro haptic sensors 2804, a feedback plane, haptic projectionary pages 2801, a bluetooth sensor and beacon 2802, and a battery V-mount slip 2803. Haptic projection pages 2801 haptically display objects from the living book. The bluetooth sensor and beacon 2802 provide feedback between devices and user interactions. Sensations emitted from the haptic device can be processed by a minicomputer and stored in the online storage system. Haptic devices can encase the entirety of the living book, from the outer frame 2802-2806 to the inner pages 2801.

Figure 29:
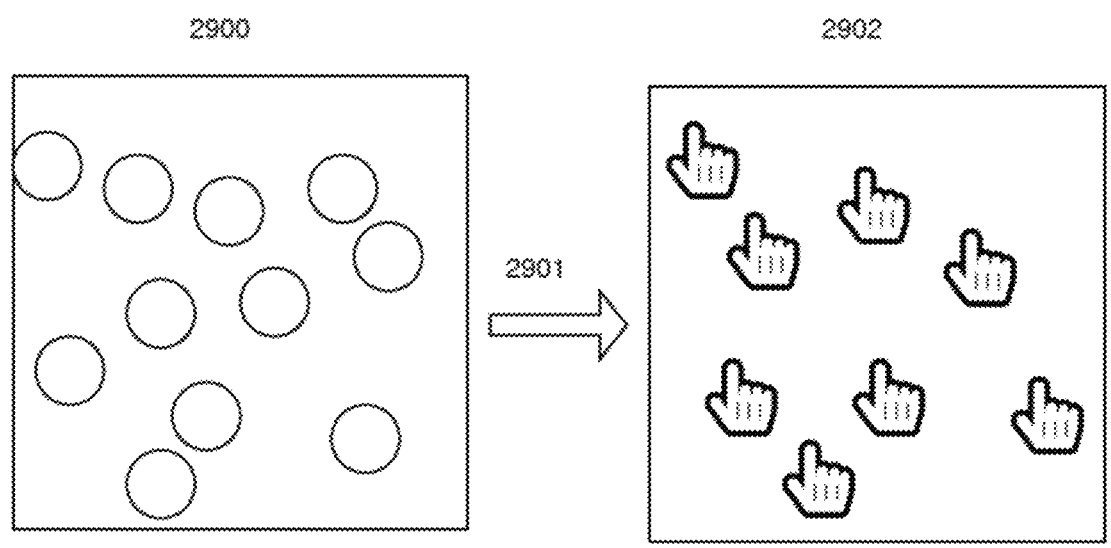
FIG. 29 depicts the mapping of objects within an extended reality environment.

Systems described herein can further include kinesthetic communication between three-dimensional objects that are superimposed in extended reality environments, thereby promoting user interaction. FIG. 29 depicts the mapping of objects within an extended reality environment. Tactical sensations occur from user interaction with haptic devices correlated to each object. When a user interacts (e.g., by touching) an object within the extended reality environment, the user can feel tactical sensations associated with the object 2902. The gestures that occur in the extended reality environment 2900 can be mapped 2901 to tactical sensations provided by the haptic devices.

Objects can be directly mapped between electronic devices and extended reality environments constantly transmitting content. Objects can alternate between bird's eye and perspective views based on rotation and positioning in an extended reality environment. Objects can be translated within the virtual environment to map objects into different locations. Each object in the extended reality space can be mapped to a corresponding object that is saved on an online database. Objects can be continuously integrated into three-dimensional vector spaces.

Superimposed images can be based on world coordinates mapping to viewport coordinates. These images can be bounded within the perimeter of electronic devices based on calculations dividing the maximum and minimum global coordinates of an environmental space. The bounds of the environmental space are scalable, which allows user creativity in an educational setting.

In extended reality, objects can be made interactable, thereby allowing users to practice problems and experiments in real-time. Extended reality audiobooks can map spoken output to three-dimensional objects and animations based on corresponding audiobook in an online database. Audiobook transcriptions can be generated and stored as an alternative for tracking current location within an audiobook. Audiobook animations and content material can remain intact during the backtracking of audible books.

Cryptocurrency Distribution System

Figure 24:
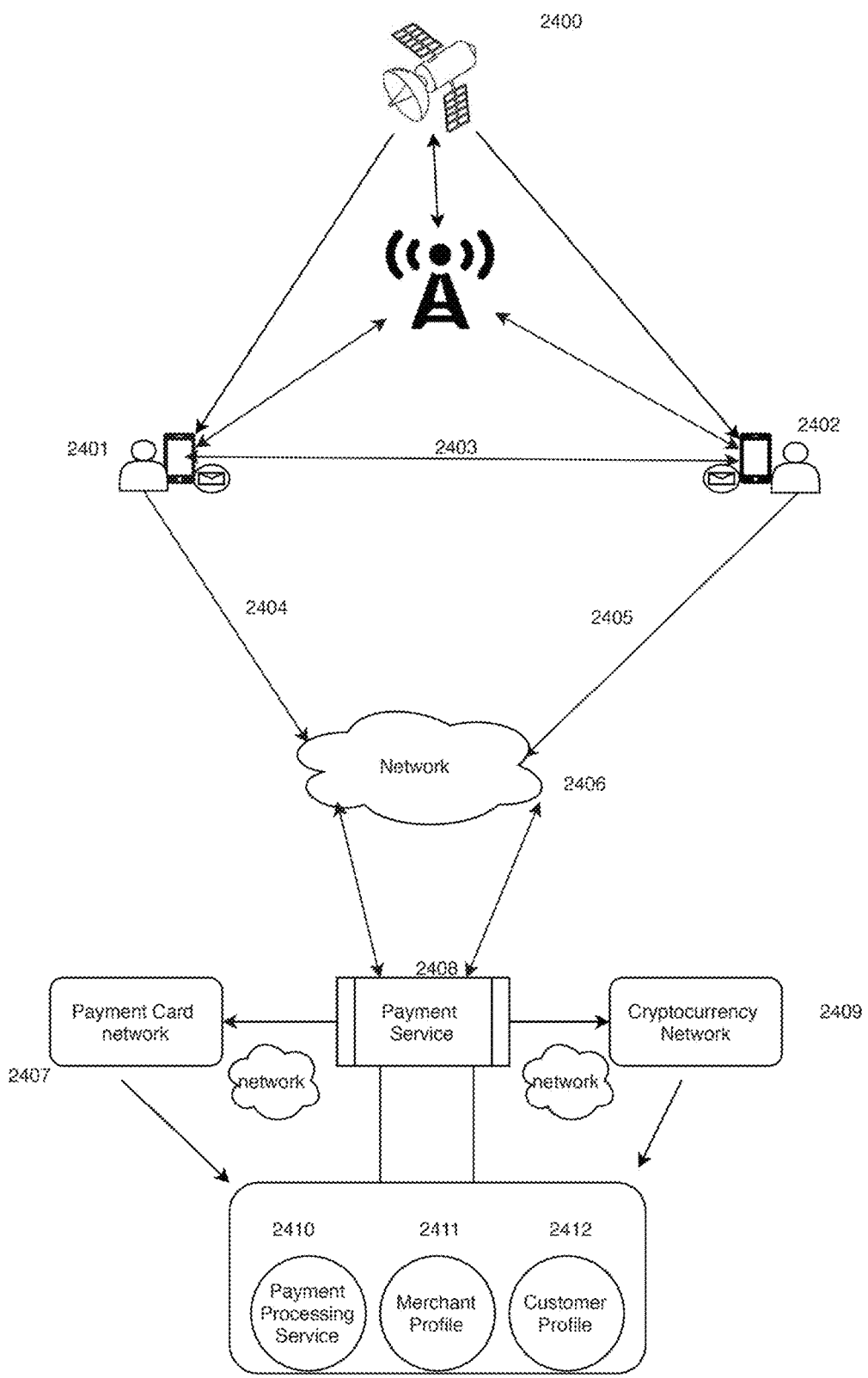
FIG. 24 depicts a blockchain payment system described herein.

Living book masters can obtain cryptocurrency in exchange for uploading content. Cryptocurrency incentivizes living books masters by creating an incentivized system for using an extended reality environment through the medium of living books. FIG. 24 depicts a blockchain payment system that mediates cryptocurrency transactions between electronic devices. On the decentralized side of systems described herein, a cryptocurrency network 2400 provides a universal payment system that allows users 2401 and 2402 to transmit and receive cryptocurrency 2404 and 2405. Users can connect to the cryptocurrency network 2406 which then connects users to an online payment system 2408. The online payment system 2408 receives payment information 2407 from users within the cryptocurrency network 2409. Users can distribute cryptocurrency funds to other users 2403 as users conduct peer-to-peer interactions within the extended reality environment. A user can be provided with a customer profile 2412. The payment processing service 2410 processes transactions, creates cryptocurrency, and distributes a designated amount of cryptocurrency to be transferred. Users can use the cryptocurrency provided by the system in exchange for third party services, for example, via a merchant profile 2411.

Figure 30:
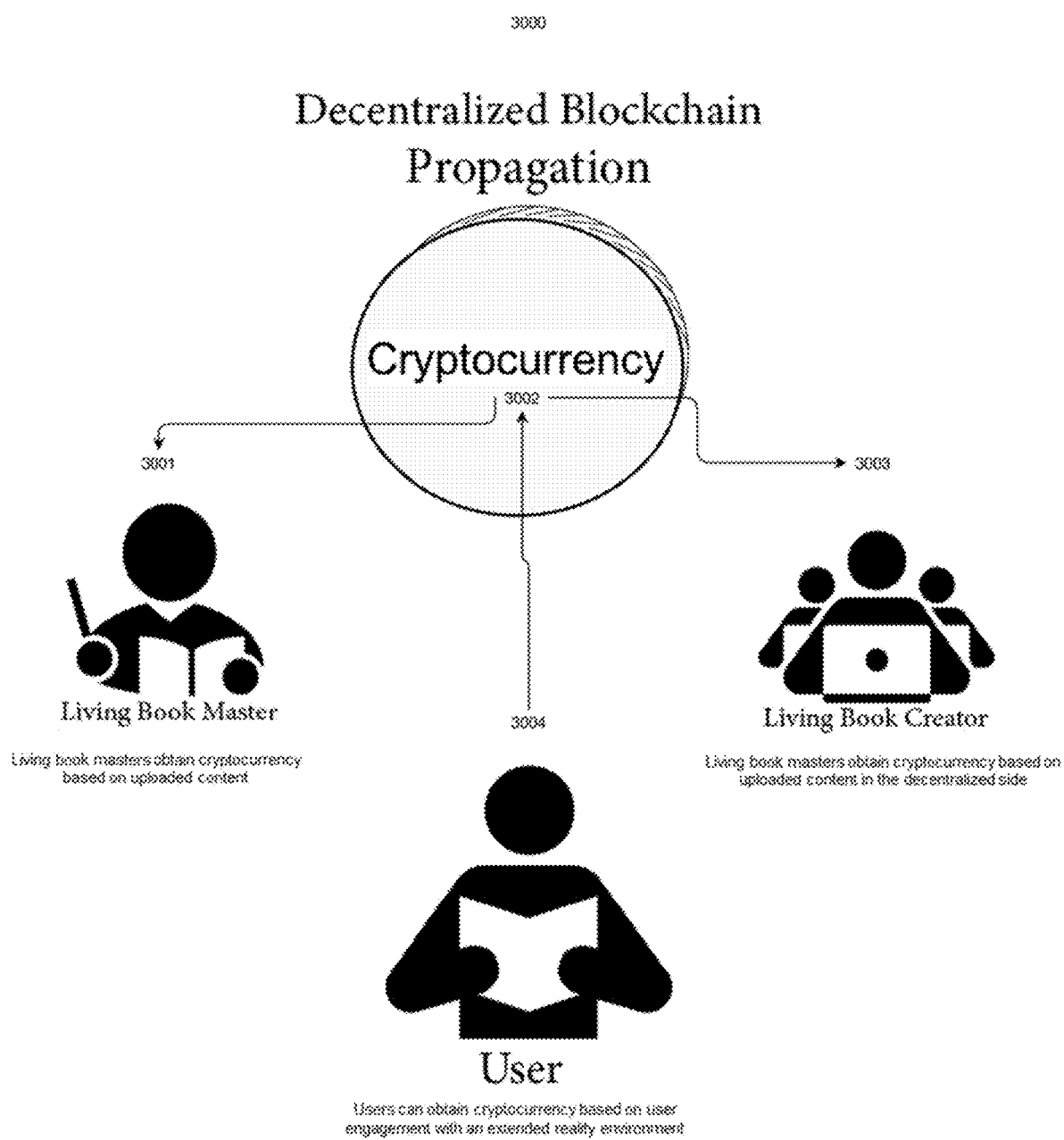
FIG. 30 depicts a cryptocurrency distribution system described herein.

FIG. 30 depicts a cryptocurrency distribution system that distributes cryptocurrency to living book masters, creators, and users based on certain criteria. Living book creators obtain cryptocurrency in exchange for uploading content. Users can obtain cryptocurrency by actively engaging in reading environments. Living book masters can obtain cryptocurrency based on the number of creations that are uploaded in their department. Living book masters 3001 and creators 3003 can obtain cryptocurrency 3002 upon uploading content. Users 3004 can obtain cryptocurrency through user engagement with extended reality environments. The decentralized blockchain 3000 primarily distributes cryptocurrency on the decentralized side; however, the centralized side can also distribute cryptocurrency on the decentralized side upon request.

The electronic payment service provides a virtual account associated with each user and receives user initiated requests for financial transactions. The system can determine that the customer initiated a request for a financial transaction. The financial transaction configures the transfer of a specified amount of currency from the virtual source to a given destination. The system can validate the financial transaction based on data received from an electronic payment service to determine a quantity of cryptocurrency equivalent to the amount of cryptocurrency, e.g., the quantity of cryptocurrency associated with the amount that the customer transferred to the electronic payment service.

In the decentralized architecture, cryptocurrency mining results in a universal method of generalized transactions. Transferring cryptocurrency from the customer account to electronic payment service can include communicating a public key that is associated with a customer account. Transferring cryptocurrency from the customer account to electronic payment service can also include communicating a private key that is associated with a customer account. The quantity of cryptocurrency transferred can exceed a total quantity of cryptocurrency associated with a customer account. In some embodiments, transferring the quantity of cryptocurrency is inferior to a total quantity of cryptocurrency associated with a customer account. Optimal exchange rate can be based on the first currency and the second currency. The cryptocurrency transaction can be physically stored at a remote location after disconnecting from the network. In some embodiments, a customized smart contract can be deployed onto a blockchain written in a language having a syntax designed to compile code for the Ethereum Virtual Machine. A customized smart contract can be a public blockchain. The customized smart contract can be run on the public blockchain.

EXAMPLES

Example 1. An Example System for Generating Extended Reality Content

Figure 33:
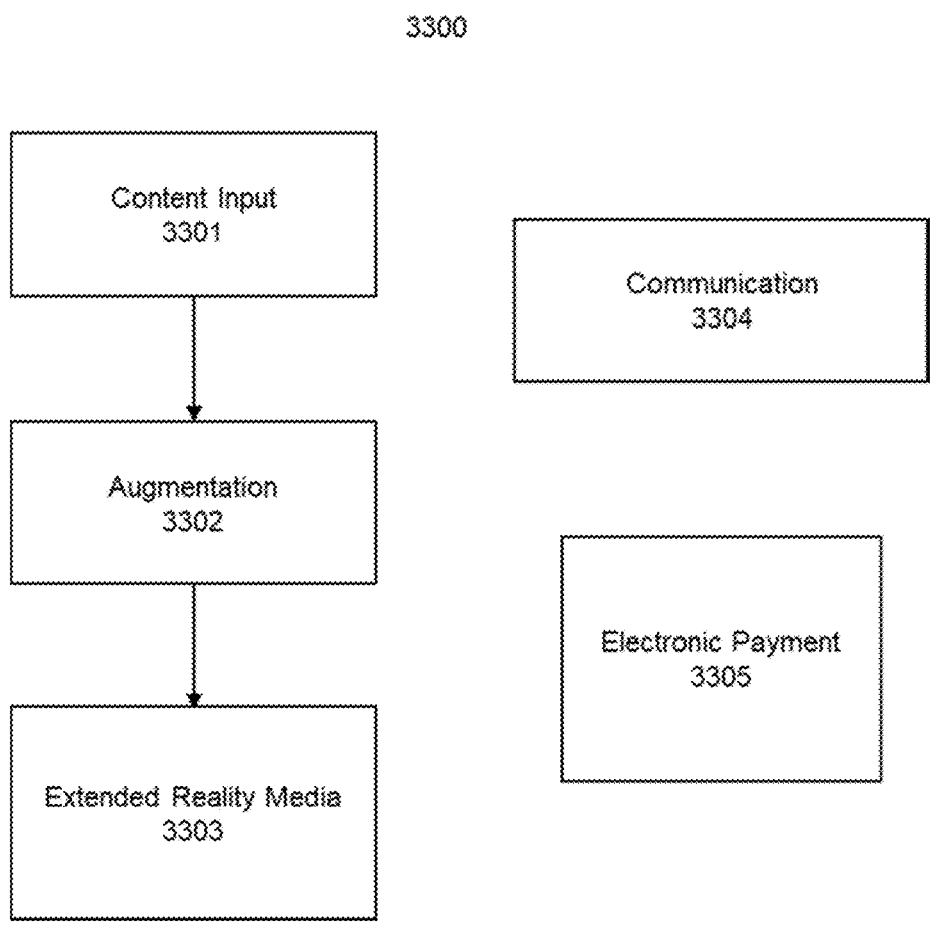
FIG. 33 depicts an example of extended reality media system described herein.

FIG. 33 illustrates an extended reality media system 3300. The extended reality system is based on a computer program product having a non-transitory computer-readable medium with computer-executable code encoded therein. The extended reality system includes a content input module 3301, an augmentation module 3302, a communication module 3304, and an electronic payment module 3305.

The content input module 3301 receives content input from a source. The source can be a user, a physical book, an electronic book, an audiobook, or a database, such as an online database. The augmentation module 3302 processes the received content input to generate a virtual representation of the extended reality media 3303. The virtual representation can be displayed on a device or projected into three-dimensional space from a device. System processing steps, such as the processing of the content input, are through the use of organic photovoltaic cells, which convert light energy to electric energy. The system can alternate between the use of organic photovoltaic cells and the use of solid state batteries. For example, when light energy is inadequate or unavailable, the system is powered by solid state batteries instead of organic photovoltaic cells.

The communication module 3304 mediates interactions between users of the system and interactions between users and the system. These interactions can be extended reality interactions and can be generated using artificial intelligence. Non-limiting examples of extended reality based interactions include multifaceted interactive narration (MIN), vocal recognition, haptic feedback, system activation/deactivation, geo-data swapping, geo-fencing, geo-legacy landmarks, geo-location, and user avatars. Additional examples of extended reality features are described herein.

The electronic payment module 3305 processes electronic payment transactions that are associated with the extended reality media. The electronic payment transaction is in the form of cryptocurrency. Electronic funds can be distributed to users in exchange for user content inputs.

EMBODIMENTS

The following non-limiting embodiments provide illustrative examples of the invention, but do not limit the scope of the invention.

Embodiment 1. A method of electronically generating extended reality based media on a device, comprising: a) processing a content input to generate a virtual representation of the extended reality based media on the device, wherein the processing of the content input is by using organic photovoltaic cells of the device; b) mediating an interaction between a plurality of users and the extended reality based media using artificial intelligence; and c) processing an electronic payment transaction that is associated with the extended reality based media.

Embodiment 2. The method of Embodiment 1, wherein the electronic payment transaction is conducted in cryptocurrency.

Embodiment 3. The method of Embodiment 1, further comprising distributing an electronic payment to a user in exchange for a user input.

Embodiment 4. The method of Embodiment 1, further comprising processing an electronic payment from a user in exchange for access to the extended reality based media.

Embodiment 5. The method of Embodiment 1, further comprising electronically narrating text from the extended reality based media by using artificial intelligence.

Embodiment 6. The method of Embodiment 1, further comprising electronically presenting on the device a visual representation of the extended reality based media, an audial representation of the extended reality based media, a tactile representation of the extended reality based media of the extended reality based media, or a combination thereof.

Embodiment 7. The method of Embodiment 1, wherein the virtual representation is an animation that is based on the content input.

Embodiment 8. The method of Embodiment 1, wherein the content input is a book.

Embodiment 9. The method of Embodiment 1, further comprising receiving the content input from a source.

Embodiment 10. The method of Embodiment 1, wherein the extended reality based media is augmented reality media.

Embodiment 11. The method of Embodiment 1, wherein the extended reality based media is virtual reality media.

Embodiment 12. The method of Embodiment 1, wherein the extended reality based media is mixed reality media.

Embodiment 13. The method of Embodiment 1, wherein the generating of the extended reality based media on the device is by light energy.

Embodiment 14. The method of Embodiment 1, wherein the interaction between a plurality of users and the extended reality based media is an extended reality interaction.

Embodiment 15. The method of Embodiment 1, further comprising receiving a user input from a user, and processing the user input into the extended reality based media.

Embodiment 16. The method of Embodiment 1, further comprising receiving a geospatial location of the device based on a first activation of the extended reality based media on the device.

Embodiment 17. The method of Embodiment 1, further comprising receiving a time stamp of a first activation of the extended reality based media on the device.

Embodiment 18. The method of Embodiment 1, further comprising receiving a date stamp of a first activation of the extended reality based media on the device.

Embodiment 19. The method of Embodiment 1, further comprising deactivating of the extended reality based media on the device based on a current geospatial location of the device.

Embodiment 20. The method of Embodiment 1, further comprising deactivating of the extended reality based media on the device based on a current time or a current date.

What is claimed is:

1. A method of electronically generating extended reality based media on a device, comprising:
    a) processing a content input to generate a virtual representation of the extended reality based media on the device, wherein the processing of the content input is by using organic photovoltaic cells of the device;
    b) mediating an interaction between a plurality of users and the extended reality based media using artificial intelligence; and
    c) processing an electronic payment transaction that is associated with the extended reality based media.

2. The method of claim 1, wherein the electronic payment transaction is conducted in cryptocurrency.

3. The method of claim 1, further comprising distributing an electronic payment to a user in exchange for a user input.

4. The method of claim 1, further comprising processing an electronic payment from a user in exchange for access to the extended reality based media.

5. The method of claim 1, further comprising electronically narrating text from the extended reality based media by using artificial intelligence.

6. The method of claim 1, further comprising electronically presenting on the device a visual representation of the extended reality based media, an audial representation of the extended reality based media, a tactile representation of the extended reality based media of the extended reality based media, or a combination thereof.

7. The method of claim 1, wherein the virtual representation is an animation that is based on the content input.

8. The method of claim 1, wherein the content input is a book.

9. The method of claim 1, further comprising receiving the content input from a source.

10. The method of claim 1, wherein the extended reality based media is augmented reality media.

11. The method of claim 1, wherein the extended reality based media is virtual reality media.

12. The method of claim 1, wherein the extended reality based media is mixed reality media.

13. The method of claim 1, wherein the generating of the extended reality based media on the device is by light energy.

14. The method of claim 1, wherein the interaction between the plurality of users and the extended reality based media is an extended reality interaction.

15. The method of claim 1, further comprising receiving a user input from a user, and processing the user input into the extended reality based media.

16. The method of claim 1, further comprising receiving a geospatial location of the device based on a first activation of the extended reality based media on the device.

17. The method of claim 1, further comprising receiving a time stamp of a first activation of the extended reality based media on the device.

18. The method of claim 1, further comprising receiving a date stamp of a first activation of the extended reality based media on the device.

19. The method of claim 1, further comprising deactivating of the extended reality based media on the device based on a current geospatial location of the device.

20. The method of claim 1, further comprising deactivating of the extended reality based media on the device based on a current time or a current date.

\* \* \* \* \*